United States Patent
Tsai et al.

(10) Patent No.: US 10,972,952 B2
(45) Date of Patent: Apr. 6, 2021

(54) METHOD AND APPARATUS FOR PDCCH MONITORING IN A WIRELESS COMMUNICATION SYSTEM

(71) Applicant: ASUSTek Computer Inc., Taipei (TW)

(72) Inventors: Hsin-Hsi Tsai, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/351,715

(22) Filed: Mar. 13, 2019

(65) Prior Publication Data

US 2019/0297547 A1 Sep. 26, 2019

Related U.S. Application Data

(60) Provisional application No. 62/646,719, filed on Mar. 22, 2018.

(51) Int. Cl.
*H04W 36/08* (2009.01)
*H04W 76/27* (2018.01)
(Continued)

(52) U.S. Cl.
CPC ............. *H04W 36/08* (2013.01); *H04B 7/00* (2013.01); *H04B 7/0617* (2013.01);
(Continued)

(58) Field of Classification Search
CPC . H04W 72/14; H04W 36/08; H04W 74/0833; H04W 72/046; H04W 76/27;
(Continued)

(56) References Cited

U.S. PATENT DOCUMENTS

2017/0006613 A1* 1/2017 Kakishima ............. H04B 7/024
2017/0302341 A1* 10/2017 Yu ...................... H04W 72/0446
(Continued)

FOREIGN PATENT DOCUMENTS

| WO | 2017180258 | 10/2017 |
|----|------------|---------|
| WO | 2018093939 | 5/2018 |
| WO | 2018203308 | 11/2018 |

OTHER PUBLICATIONS

"Discussion on RACH-less Handover for NR", 2018, Oppo, 3GPP TSG-RAN WG2#101, R2-1801786 Athens, Greece, Resubmission of R2-1712220, 5 pgs.

(Continued)

*Primary Examiner* — Chi Ho A Lee
*Assistant Examiner* — Andrew Lee
(74) *Attorney, Agent, or Firm* — Cooper Legal Group, LLC

(57) ABSTRACT

A method and apparatus are disclosed. In an example from the perspective of a User Equipment (UE), a signal to configure the UE to perform a Random Access Channel-less (RACH-less) handover to a second cell may be received in a first cell, wherein the signal comprises a candidate list of beams for Physical Downlink Control Channel (PDCCH) monitoring in the second cell and/or the signal is indicative of a first beam of the candidate list of beams (to be used by the UE for PDCCH monitoring). A PDCCH in the second cell on the first beam may be monitored before receiving a Medium Access Control (MAC) Control Element (CE) assigning a second beam for PDCCH monitoring in the second cell.

20 Claims, 32 Drawing Sheets

(51) Int. Cl.
*H04B 7/06* (2006.01)
*H04L 5/00* (2006.01)
*H04W 24/08* (2009.01)
*H04W 24/10* (2009.01)
*H04W 72/04* (2009.01)
*H04W 72/14* (2009.01)
*H04W 74/08* (2009.01)
*H04W 80/02* (2009.01)
*H04B 7/00* (2006.01)
*H04W 36/00* (2009.01)

(52) U.S. Cl.
CPC ......... *H04B 7/0626* (2013.01); *H04B 7/0695* (2013.01); *H04L 5/0048* (2013.01); *H04L 5/0094* (2013.01); *H04W 24/08* (2013.01); *H04W 24/10* (2013.01); *H04W 36/0077* (2013.01); *H04W 72/042* (2013.01); *H04W 72/046* (2013.01); *H04W 72/14* (2013.01); *H04W 74/0833* (2013.01); *H04W 76/27* (2018.02); *H04W 80/02* (2013.01); *H04L 5/0053* (2013.01)

(58) Field of Classification Search
CPC ........ H04W 24/08; H04W 80/02; H04B 7/06; H04B 7/0626; H04L 5/00; H04L 5/0048
See application file for complete search history.

(56) References Cited

U.S. PATENT DOCUMENTS

| | | | |
|---|---|---|---|
| 2018/0020382 A1* | 1/2018 | Kim | H04W 36/0055 |
| 2018/0049079 A1* | 2/2018 | Ozturk | H04W 28/16 |
| 2018/0199251 A1* | 7/2018 | Kim | H04W 72/14 |
| 2019/0182730 A1* | 6/2019 | Yeh | H04L 43/16 |
| 2019/0215701 A1* | 7/2019 | Honglei | H04B 7/0617 |
| 2019/0215901 A1* | 7/2019 | Jiang | H04L 5/0005 |
| 2019/0254120 A1* | 8/2019 | Zhang | H04W 4/80 |
| 2019/0260458 A1* | 8/2019 | Zhou | H04B 7/0877 |
| 2019/0261195 A1* | 8/2019 | Cheng | H04W 24/10 |
| 2019/0261281 A1* | 8/2019 | Jung | H04W 52/50 |
| 2019/0274165 A1* | 9/2019 | Pu | H04W 72/0446 |
| 2019/0281523 A1* | 9/2019 | Lee | H04W 48/18 |
| 2020/0059398 A1* | 2/2020 | Pan | H04W 72/0413 |

OTHER PUBLICATIONS

European Search report from corresponding EP application No. 19162549.0, dated by Jun. 24, 2019, 7 pgs.

* cited by examiner

600

```
-- ASN1START

MobilityControlInfo ::=         SEQUENCE {
    targetPhysCellId                PhysCellId,
    carrierFreq                     CarrierFreqEUTRA                OPTIONAL,   -- Cond HO-
toEUTRA2
    carrierBandwidth                CarrierBandwidthEUTRA           OPTIONAL,   -- Cond HO-
toEUTRA
    additionalSpectrumEmission      AdditionalSpectrumEmission      OPTIONAL,   -- Cond HO-
toEUTRA
    t304                            ENUMERATED {
                                        ms50, ms100, ms150, ms200, ms500, ms1000,
                                        ms2000, ms10000-v1310},
    newUE-Identity                  C-RNTI,
    radioResourceConfigCommon       RadioResourceConfigCommon,
    rach-ConfigDedicated            RACH-ConfigDedicated            OPTIONAL,   -- Need OP
    ...,
    [[ carrierFreq-v9e0             CarrierFreqEUTRA-v9e0           OPTIONAL    -- Need ON
    ]],
    [[ drb-ContinueROHC-r11         ENUMERATED {true}               OPTIONAL    -- Cond HO
    ]],
    [[ mobilityControlInfoV2X-r14   MobilityControlInfoV2X-r14      OPTIONAL,   -- Need ON
       handoverWithoutWT-Change-r14 ENUMERATED {keepLWA-Config, sendEndMarker} OPTIONAL, --
Cond HO
       makeBeforeBreak-r14          ENUMERATED {true}               OPTIONAL,   -- Need OR
       rach-Skip-r14                RACH-Skip-r14                   OPTIONAL,   -- Need OR
       sameSFN-Indication-r14       ENUMERATED {true}               OPTIONAL    -- Cond HO-
SFNsynced
    ]],
    [[
       mib-RepetitionStatus-r14     BOOLEAN                         OPTIONAL,   -- Need OR
       schedulingInfoSIB1-BR-r14    INTEGER (0..31)                 OPTIONAL    -- Cond HO-
SFNsynced
    ]]
}

MobilityControlInfo-v1010 ::=   SEQUENCE {
    additionalSpectrumEmission-v1010 AdditionalSpectrumEmission-v1010 OPTIONAL   -- Need ON
}

MobilityControlInfoSCG-r12 ::=  SEQUENCE {
    t307-r12                        ENUMERATED {
                                        ms50, ms100, ms150, ms200, ms500, ms1000,
                                        ms2000, spare1},
    ue-IdentitySCG-r12              C-RNTI                          OPTIONAL,   -- Cond SCGEst,
    rach-ConfigDedicated-r12        RACH-ConfigDedicated            OPTIONAL,   -- Need OP
    cipheringAlgorithmSCG-r12       CipheringAlgorithm-r12          OPTIONAL,   -- Need ON
    ...,
    [[ makeBeforeBreakSCG-r14       ENUMERATED {true}               OPTIONAL,   -- Need OR
       rach-SkipSCG-r14             RACH-Skip-r14                   OPTIONAL    -- Need OR
    ]]
}

MobilityControlInfoV2X-r14 ::=  SEQUENCE {
    v2x-CommTxPoolExceptional-r14   SL-CommResourcePoolV2X-r14      OPTIONAL,   -- Need OR
    v2x-CommRxPool-r14              SL-CommRxPoolListV2X-r14        OPTIONAL,   -- Need OR
    v2x-CommSyncConfig-r14          SL-SyncConfigListV2X-r14        OPTIONAL,   -- Need OR
    cbr-MobilityTxConfigList-r14    SL-CBR-CommonTxConfigList-r14   OPTIONAL    -- Need OR
}

CarrierBandwidthEUTRA ::=       SEQUENCE {
    dl-Bandwidth                    ENUMERATED {
                                        n6, n15, n25, n50, n75, n100, spare10,
                                        spare9, spare8, spare7, spare6, spare5,
                                        spare4, spare3, spare2, spare1},
    ul-Bandwidth                    ENUMERATED {
                                        n6, n15, n25, n50, n75, n100, spare10,
                                        spare9, spare8, spare7, spare6, spare5,
                                        spare4, spare3, spare2, spare1} OPTIONAL -- Need OP
}
```

FIG. 6A

```
CarrierFreqEUTRA ::=              SEQUENCE {
    dl-CarrierFreq                    ARFCN-ValueEUTRA,
    ul-CarrierFreq                    ARFCN-ValueEUTRA          OPTIONAL    -- Cond FDD
}

CarrierFreqEUTRA-v9e0 ::=         SEQUENCE {
    dl-CarrierFreq-v9e0               ARFCN-ValueEUTRA-r9,
    ul-CarrierFreq-v9e0               ARFCN-ValueEUTRA-r9       OPTIONAL    -- Cond FDD
}

RACH-Skip-r14 ::=                 SEQUENCE {
    targetTA-r14                      CHOICE {
        ta0-r14                           NULL,
        mcg-PTAG-r14                      NULL,
        scg-PTAG-r14                      NULL,
        mcg-STAG-r14                      STAG-Id-r11,
        scg-STAG-r14                      STAG-Id-r11
    },
    ul-ConfigInfo-r14                 SEQUENCE {
        numberOfConfUL-Processes-r14       INTEGER (1..8),
        ul-SchedInterval-r14               ENUMERATED {sf2, sf5, sf10},
        ul-StartSubframe-r14               INTEGER (0..9),
        ul-Grant-r14                       BIT STRING (SIZE (16))
    }                                                           OPTIONAL    -- Need OR
}

-- ASN1STOP
```

FIG. 6B

```
MobilityParameters-r14 ::=        SEQUENCE {
    makeBeforeBreak-r14               ENUMERATED {supported}    OPTIONAL,
    rach-Less-r14                     ENUMERATED {supported}    OPTIONAL
}
```

| Component/ Step | Description | Time (ms) |
|---|---|---|
| 7 | RRC Connection Reconfiguration incl. *mobilityControlInfo* | 15 |
| 8 | SN Status Transfer | 0 |
| 9.1 | Target cell search | 0 |
| 9.2 | UE processing time for RF/baseband re-tuning, security update | 20 |
| 9.3 | Delay to acquire first available PRACH in target eNB | 0.5/2.5 |
| 9.4 | PRACH preamble transmission | 1 |
| 10 | UL Allocation + TA for UE | 3/5 |
| 11 | UE sends RRC Connection Reconfiguration Complete | 6 |
|  | Minimum/Typical Total delay [ms] | 45.5/49.5 |

| Component/ Step | Description | Time (ms) |
|---|---|---|
| 7 | RRC Connection Reconfiguration Incl. *mobilityControlInfo* | 0 |
| 8 | SN Status Transfer | 0 |
| 9.1 | Target cell search | 0 |
| 9.2 | UE processing time for RF/baseband re-tuning, security update | 0 |
| 9.3 | Delay to acquire first available PRACH in target eNB | 0 |
| 9.4 | PRACH preamble transmission | 0 |
| 10 | UL Allocation + TA for UE | 0 |
| 11 | UE sends RRC Connection Reconfiguration Complete | 0 |
| | Minimum/Typical Total delay [ms] | 0 |

```
-- ASN1START
-- TAG-RRCRECONFIGURATION-START

RRCReconfiguration ::=              SEQUENCE {
    rrc-TransactionIdentifier           RRC-TransactionIdentifier,
    criticalExtensions                  CHOICE {
        rrcReconfiguration                  RRCReconfiguration-IEs,
        criticalExtensionsFuture            SEQUENCE {}
    }
}

RRCReconfiguration-IEs ::=          SEQUENCE {
    -- Configuration of Radio Bearers (DRBs, SRBs) including SDAP/PDCP.
    -- In EN-DC this field may only be present if the RRCReconfiguration
    -- is transmitted over SRB3.
    radioBearerConfig                   RadioBearerConfig
                                                        OPTIONAL, -- Need M -- Configuration of secondary cell group (EN-DC):
    secondaryCellGroup                  CellGroupConfig
            OPTIONAL, -- Need M measConfig                          MeasConfig
                OPTIONAL, -- Need M lateNonCriticalExtension            OCTET
STRING                                                  OPTIONAL,
    nonCriticalExtension                SEQUENCE
{}                                                      OPTIONAL
}

-- TAG-RRCRECONFIGURATION-STOP
-- ASN1STOP
```

```
-- ASN1START
-- TAG-RRCRECONFIGURATIONCOMPLETE-START

RRCReconfigurationComplete ::=          SEQUENCE {
    rrc-TransactionIdentifier               RRC-TransactionIdentifier,
    criticalExtensions                      CHOICE {
        rrcReconfigurationComplete              RRCReconfigurationComplete-IEs,
        criticalExtensionsFuture                SEQUENCE {}
    }
}

RRCReconfigurationComplete-IEs ::= SEQUENCE {
    -- FFS lateNonCriticalExtension            OCTET
STRING                                                              OPTIONAL,
    nonCriticalExtension                SEQUENCE
{}                                                                  OPTIONAL
}

-- TAG-RRCRECONFIGURATIONCOMPLETE-STOP
-- ASN1STOP
```

```
-- ASN1START
-- TAG-CELL-GROUP-CONFIG-START

-- Configuration of one Cell-Group:
CellGroupConfig ::=                         SEQUENCE {
    cellGroupId                                 CellGroupId, -- Logical Channel configuration and association with radio bearers:
    rlc-BearerToAddModList                      SEQUENCE (SIZE(1..maxLCH)) OF RLC-Bearer-
Config            OPTIONAL,     -- Need N
    rlc-BearerToReleaseList                     SEQUENCE (SIZE(1..maxLCH)) OF
LogicalChannelIdentity       OPTIONAL,      -- Need N -- Parameters applicable for the entire cell group:
    mac-CellGroupConfig                         MAC-
CellGroupConfig                                                OPTIONAL,    -- Need M
    physicalCellGroupConfig                     PhysicalCellGroupConfig
            OPTIONAL,    -- Need M -- Serving Cell specific parameters (SpCell and SCells)
    spCellConfig                                SpCellConfig
            OPTIONAL,    -- Need M
    sCellToAddModList                           SEQUENCE (SIZE (1..maxNrofSCells)) OF
SCellConfig       OPTIONAL,     -- Need N
    -- List of seconary serving cells to be released (not applicable for SpCells)
    sCellToReleaseList                          SEQUENCE (SIZE (1..maxNrofSCells)) OF
SCellIndex                OPTIONAL,      -- Need N
    ...
}

-- The ID of a cell group. 0 identifies the master cell group. Other values identify secondary
cell groups.
-- In this version of the specification only values 0 and 1 are supported.
-- FFS: Should the constant anyway account for larger values? Extending it in the future will
otherwise become very difficult.
CellGroupId ::=                             INTEGER (0.. maxSecondaryCellGroups)

RLC-Bearer-Config ::=                       SEQUENCE {
    -- ID used commonly for the MAC logical channel and for the RLC bearer.
    logicalChannelIdentity                      LogicalChannelIdentity, -- Associates the RLC Bearer with an SRB or a DRB. The UE shall deliver DL RLC SDUs received
via the RLC entity of this
    -- RLC bearer to the PDCP entity of the servedRadioBearer. Furthermore, the UE shall advertise
and deliver uplink PDCP PDUs of the
    -- uplink PDCP entity of the servedRadioBearer to the uplink RLC entity of this RLC bearer
unless the uplink scheduling
    -- restrictions ('moreThanOneRLC' in PDCP-Config and the restrictions in LogicalChannelConfig)
forbid it to do so.
    servedRadioBearer                           CHOICE {
        srb-Identity                                SRB-Identity,
        drb-Identity                                DRB-Identity
    }
            OPTIONAL,    -- Cond LCH-SetupOnly reestablishRLC                              ENUMERATED
{true}                                                         OPTIONAL,    -- Need N
    rlc-Config                                  RLC-
Config                                                         OPTIONAL,    -- Cond LCH-Setup mac-
LogicalChannelConfig                        LogicalChannelConfig
        OPTIONAL     -- Cond LCH-Setup
}

LogicalChannelIdentity ::=              INTEGER (1..maxLC-ID)

-- Cell-Group specific L1 parameters
PhysicalCellGroupConfig ::=                 SEQUENCE {
```

```
    -- Enables spatial bundling of HARQ ACKs. It is configured per cell group (i.e. for all the
cells within the cell group) for PUCCH
    -- reporting of HARQ-ACK. It is only applicable when more than 4 layers are possible to
schedule.
    -- Corresponds to L1 parameter 'HARQ-ACK-spatial-bundling' (see 38.213, section FFS_Section)
    -- Absence indicates that spatial bundling is disabled.
    harq-ACK-SpatialBundlingPUCCH          ENUMERATED
{true}                                     OPTIONAL,     -- Need R -- Enables spatial bundling of HARQ ACKs. It is configured per cell group (i.e. for all the
cells within the cell group) for PUSCH
    -- reporting of HARQ-ACK. It is only applicable when more than 4 layers are possible to
schedule.
    -- Corresponds to L1 parameter 'HARQ-ACK-spatial-bundling' (see 38.213, section FFS_Section)
    -- Absence indicates that spatial bundling is disabled.
    harq-ACK-SpatialBundlingPUSCH          ENUMERATED
{true}                                     OPTIONAL,     -- Need R
    p-NR                                   P-Max                       OPTIONAL,
    nonCriticalExtension                   SEQUENCE{}
            OPTIONAL
}

-- Serving cell specific MAC and PHY parameters for a SpCell:
SpCellConfig ::=                           SEQUENCE {
    -- Serving cell ID of a PSCell (the PCell of the Master Cell Group uses ID = 0)
    servCellIndex                          ServCellIndex
            OPTIONAL,    -- Cond SCG
    -- Parameters for the synchronous reconfiguration to the target SpCell:
    reconfigurationWithSync                SEQUENCE {
        spCellConfigCommon                 ServingCellConfigCommon,
        newUE-Identity                     RNTI-Value,
        t304                               ENUMERATED {ms50, ms100, ms150, ms200, ms500, ms1000,
ms2000, ms10000},
        rach-ConfigDedicated               CHOICE {
            uplink                             RACH-ConfigDedicated,
            supplementaryUplink                RACH-ConfigDedicated
        }
            OPTIONAL     -- Need N
    }
            OPTIONAL,    -- Cond ReconfWithSync rlf-TimersAndConstants                 RLF-
TimersAndConstants                                                     OPTIONAL,    -- Need M
    spCellConfigDedicated                  ServingCellConfig
        OPTIONAL     -- Need M
}

SCellConfig ::=                            SEQUENCE {
    sCellIndex                             SCellIndex,
    sCellConfigCommon                      ServingCellConfigCommon
        OPTIONAL,    -- Cond SCellAdd
    sCellConfigDedicated                   ServingCellConfig
        OPTIONAL     -- Cond SCellAddMod
}

-- TAG-CELL-GROUP-CONFIG-STOP
-- ASN1STOP
```

```
-- ASN1START
-- TAG-SERVING-CELL-CONFIG-START

ServingCellConfig ::=        SEQUENCE {
    -- L1 parameters:

tdd-UL-DL-ConfigurationDedicated    TDD-UL-DL-
ConfigDedicated                                              OPTIONAL,  -- Cond TDD -- The dedicated (UE-specific) configuration for the initial downlink bandwidth-part.
    -- FFS: Discuss and then clarify in condition which serving cells have an initial BWP
    initialDownlinkBWP                  DownlinkBWP-
Dedicated                                                    OPTIONAL,  -- Need M -- List of additional downlink bandwidth parts to be released. (see 38.211, 38.213, section
12).
    downlinkBWP-ToReleaseList            SEQUENCE (SIZE (1..maxNrofBWPs)) OF BWP-
Id                                                           OPTIONAL,  -- Need N
    -- List of additional downlink bandwidth parts to be added or modified. (see 38.211, 38.213,
section 12).
    downlinkBWP-ToAddModList             SEQUENCE (SIZE (1..maxNrofBWPs)) OF
DownlinkBWP                                                  OPTIONAL,  -- Need N -- ID of the downlink bandwidth part to be used upon MAC-activation of an  SCell. If not
provided, the UE uses the default BWP.
    -- The initial bandwidth part is referred to by BWP-Id = 0.
    firstActiveDownlinkBWP-Id            BWP-
Id                                                           OPTIONAL,  -- Cond
SCellOnly -- The duration in ms after which the UE falls back to the default Bandwidth Part. (see 38.321,
section 5.15)
    -- The value 0.5 ms is only applicable for carriers >6 GHz.
    -- FFS: RAN2 to discuss/confirm value range. RAN1 just suggested values from 1ms/0.5ms and up
to about 50 ms.
    -- When the network releases the timer configuration, the UE stops the timer without switching
to the default BWP.
    bwp-InactivityTimer                  SetupRelease { ENUMERATED {
                                                    ms0dot5, ms1, ms2, ms3, ms4, ms5, ms6, ms8,
ms10,
                                                    ms20, ms30, ms40, ms50, ms60, ms80, spare}
}                OPTIONAL,  -- Need M -- Corresponds to L1 parameter 'default-DL-BWP'. The initial bandwidth part is referred to by
BWP-Id = 0.
    -- ID of the downlink bandwidth part to be used upon expiry of txxx.
    -- This field is UE specific. When the field is absent the UE uses the the initial BWP as
default BWP.
    -- (see 38.211, 38.213, section 12 and 38.321, section 5.15)
    -- FFS: Whether to add a default uplink BWP
    defaultDownlinkBWP-Id                BWP-
Id                                                           OPTIONAL,  -- Need M uplinkConfig                         UplinkConfig
                    OPTIONAL,  -- Need M
    supplementaryUplink                  UplinkConfig
                                                             OPTIONAL,  -- Need M -- FFS in RAN1: Tracking Reference Signals configuration: TRS-Config?
    csi-MeasConfig                       CSI-
MeasConfig                                                   OPTIONAL, -- MAC parameters:
    sCellDeactivationTimer               ENUMERATED {ms20, ms40, ms80, ms160, ms200, ms240, ms320,
ms400, ms480, ms520, ms640,
                                                    ms720, ms840, ms1280,
spare2,spare1}                  OPTIONAL,  -- Cond ServingCellWithoutPUCCH -- Indicates whether this SCell is cross-carrier scheduled by another serving cell.
```

```
    -- FFS: How to indicate whether CIF is present in the DCIs of the PCell? Should the
CrossCarrierSchedulingConfig be included
    -- and set to own so that the field "cif-Presence" can be set?
    crossCarrierSchedulingConfig        CrossCarrierSchedulingConfig
                OPTIONAL,    -- Cond SCell -- Timing Advance Group ID, as specified in TS 38.321 [3], which this cell belongs to.
    tag-Id                              TAG-Id,
    -- Enables the "UE beam lock function (UBF)", which disable changes to the UE beamforming
configuration when in NR_RRC_CONNECTED.
    -- FFS: Parameter added preliminary based on RAN4 LS in R4-1711823. Decide where to place it
(maybe ServingCellConfigCommon or
    -- in a BeamManagement IE??)
    ue-BeamLockFunction                 ENUMERATED
{enabled}                                                           OPTIONAL, -- Indicates whether UE shall apply as pathloss reference either the downlink of PCell or of
SCell that corresponds with this uplink
    -- (see 38.213, section 7)
    pathlossReferenceLinking            ENUMERATED {pCell,
sCell}                                                              OPTIONAL    -- Cond SCell
}

UplinkConfig ::=                        SEQUENCE {
    -- The dedicated (UE-specific) configuration for the initial uplink bandwidth-part.
    -- FFS: Discuss and then clarify in condition which serving cells have an initial BWP
    initialUplinkBWP                    UplinkBWP-
Dedicated                                                           OPTIONAL,   -- Need M -- The additional bandwidth parts for uplink. In case of TDD uplink- and downlink BWP with the
same bandwidthPartId are considered
    -- as a BWP pair and must have the same center frequency.
    uplinkBWP-ToReleaseList             SEQUENCE (SIZE (1..maxNrofBWPs)) OF BWP-
Id                      OPTIONAL,   -- Need N
    uplinkBWP-ToAddModList              SEQUENCE (SIZE (1..maxNrofBWPs)) OF
UplinkBWP                           OPTIONAL,   -- Need N -- ID of the uplink bandwidth part to be used upon MAC-activation of an SCell. If not
provided, the UE uses the FFS: default BWP.
    -- The initial bandwidth part is referred to by BandiwdthPartId = 0.
    firstActiveUplinkBWP-Id             BWP-
Id                                                                  OPTIONAL -- Cond SCellOnly
}

-- TAG-SERVING-CELL-CONFIG-STOP
-- ASN1STOP
```

```
-- ASN1START
-- TAG-PDCCH-CONFIG-START

PDCCH-Config ::=                        SEQUENCE {
    -- List of UE specifically configured Control Resource Sets (CORESETs) to be used by the UE.
    -- The network configures at most 3 CORESETs per BWP per cell (including the initial CORESET).
        controlResourceSetToAddModList        SEQUENCE(SIZE (1..maxNrofControlResourceSets-1)) OF
ControlResourceSet       OPTIONAL, controlResourceSetToReleaseList       SEQUENCE(SIZE (1..maxNrofControlResourceSets-1)) OF
ControlResourceSetId         OPTIONAL, -- List of UE specifically configured Control Resource Sets (CORESETs).
    -- The network configures at most 10 Search Spaces per BWP per cell (including the initial
Search Space).
    -- FFS: RAN1 decided to model each RNTI which the UE monitors on PDCCH as a separate Search
Space. Many of those are configured
    -- in the respective feature/channel configurations (e.g. CSI-RNTI, TPC-PUSCH-RNTI, TPC-PUCCH-
RNTI, SPS-RNTI). Others are configured
    -- below (SFI-RNTI, INT-RNTI). ==> Aim to find a common generic structure.
        searchSpacesToAddModList              SEQUENCE(SIZE (1..maxNrofSearchSpaces-1)) OF
SearchSpace                  OPTIONAL, searchSpacesToReleaseList             SEQUENCE(SIZE (1..maxNrofSearchSpaces-1)) OF
SearchSpaceId                OPTIONAL, -- Configuration of Slot-Format-Indicators to be monitored in this cell
    -- FFS: Can there be just one or multiple such configurations within a PDCCH-Config? How does
it relate to BWP, CORESET(s)?
        slotFormatIndicator                   SlotFormatIndicator
                    OPTIONAL, -- FFS: Is there a default timing (to be used at least until first reconfiguration). Are the
fields optionally present?
        timeDomainResourceAllocation         SEQUENCE {
            -- List of time-domain configurations for timing of DL assignment to DL data
            pdsch-AllocationList              SEQUENCE (SIZE(1..maxNrofDL-Allocations)) OF PDSCH-
TimeDomainResourceAllocation, -- Number of repetitions for data. Corresponds to L1 parameter 'aggregation-factor-DL' (see
38.214, section FFS_Section)
            -- When the field is absent the UE applies the value 1
            pdsch-AggregationFactor                   ENUMERATED { n2, n4, n8 }
    }                                                            OPTIONAL,   -- Need R -- List of time domain allocations for timing of UL assignment to UL data
            pusch-AllocationList              SEQUENCE (SIZE(1..maxNrofUL-Allocations)) OF PUSCH-
TimeDomainResourceAllocation,
```

```
        -- Number of repetition for data. Corresponds to L1 parameter 'aggregation-factor-UL' (see
38.214, section FFS_Section)

-- When the field is absent the UE applies the value 1 pusch-AggregationFactor              ENUMERATED { n2, n4, n8
}                                            OPTIONAL,    -- Need R -- List of timing for given PDSCH to the DL ACK. In this version of the specification only
the values [0..8] are applicable.

-- Corresponds to L1 parameter 'Slot-timing-value-K1' (see 38.213, section FFS_Section)

dl-data-to-UL-ACK                    SEQUENCE (SIZE (8)) OF INTEGER
(0..15)                                      OPTIONAL    -- Need M }
                            OPTIONAL     -- Need M

}

PDSCH-TimeDomainResourceAllocation ::=  SEQUENCE {

-- Corresponds to L1 parameter 'K0' (see 38.214, section FFS_Section)

-- When the field is absent the UE applies the value 0 k0                              INTEGER
(1..3)                                                    OPTIONAL,    -- Need R -- PDSCH mapping type. Corresponds to L1 parameter 'Mapping-type' (see 38.214, section
FFS_Section)

mappingType                     ENUMERATED (typeA, typeB},

-- An index into a table/equation in RAN1 specs capturing valid combinations of start symbol
and length (jointly encoded)

-- Corresponds to L1 parameter 'Index-start-len' (see 38.214, section FFS_Section)

startSymbolAndLength            BIT STRING (SIZE (6))
}

PUSCH-TimeDomainResourceAllocation ::=  SEQUENCE {

-- Corresponds to L1 parameter 'K2' (see 38.214, section FFS_Section)

-- When the field is absent the UE applies the value 0 k2                              INTEGER
(0..7)                                                    OPTIONAL,

-- Mapping type. Corresponds to L1 parameter 'Mapping-type' (see 38.214, section FFS_Section)

mappingType                     ENUMERATED (typeA, typeB},

-- An index into a table/equation in RAN1 specs capturing valid combinations of start symbol
and length (jointly encoded)

-- Corresponds to L1 parameter 'Index-start-len' (see 38.214, section FFS_Section)

startSymbolAndLength            BIT STRING (SIZE (6))
}

-- A time/frequency control resource set (CORESET) in which to search for downlink control
information (see 38.213, section x.x.x.x)FFS_Ref
```

```
ControlResourceSet ::=                   SEQUENCE {
    -- Corresponds to L1 parameter 'CORESET-ID'
    -- Value 0 identifies the common CORESET configured in MIB and in ServingCellConfigCommon?
    -- Values 1..maxNrofControlResourceSets-1 identify CORESETs configured by dedicated signalling?
    controlResourceSetId                 ControlResourceSetId, -- Frequency domain resources for the CORESET. Each bit corresponds a group of 6 RBs, with grouping starting from PRB 0, which is fully
    -- contained in the bandwidth part within which the CORESET is configured.
    -- The most significant bit corresponds to the group of lowest frequency which is fully contained in the bandwidth part within which the
    -- CORESET is configured, each next subsequent lower significance bit corresponds to the next lowest frequency group fully contained within
    -- the bandwidth part within which the CORESET is configured, if any.
    -- Bits corresponding to a group not fully contained within the bandwidth part within which the CORESET is configured are set to zero.
    -- Corresponds to L1 parameter 'CORESET-freq-dom'(see 38.211, section 7.3.2.2)
    frequencyDomainResources             BIT STRING (SIZE (45)),
    -- Contiguous time duration of the CORESET in number of symbols
    -- Corresponds to L1 parameter 'CORESET-time-duration' (see 38.211, section 7.3.2.2FFS_Section)
    duration                             INTEGER (1..maxCoReSetDuration),
    -- Mapping of Control Channel Elements (CCE) to Resource Element Groups (REG).
    -- Corresponds to L1 parameter 'CORESET-CCE-REG-mapping-type' (see 38.211Section sections 7.3.2.2 and 7.4.1.3.2)
    cce-REG-MappingType                  CHOICE {
        interleaved                      SEQUENCE {
            -- Resource Element Groups (REGs) can be bundled to create REG bundles. This parameter defines the size of such bundles.
            -- Corresponds to L1 parameter 'CORESET-REG-bundle-size' (see 38.211, section FFS_Section)
            reg-BundleSize               ENUMERATED {n2, n3, n6},
            -- Precoder granularity in frequency domain.
            -- Corresponds to L1 parameter 'CORESET-precoder-granuality' (see 38.211, sections 7.3.2.2 and 7.4.1.3.2)
            precoderGranularity          ENUMERATED {sameAsREG-bundle, allContiguousRBs},
            -- Corresponds to L1 parameter 'CORESET-interleaver-size' (see 38.211, 38.213, section FFS_Section)
            interleaverSize              ENUMERATED {n2, n3, n6}          OPTIONAL,
            -- Corresponds to L1 parameter 'CORESET-shift-index' (see 38.211, section 7.3.2.2)
            shiftIndex                   INTEGER(0..maxNrofPhysicalResourceBlocks-1)  OPTIONAL
```

FIG. 17C

```
        },
    nonInterleaved                    NULL
},

-- A subset of the TCI states defined in TCI-States used for providing QCL relationships
between the DL RS(s) in one RS Set
    -- (TCI-State) and the PDCCH DMRS ports. Corresponds to L1 parameter 'TCI-StatesPDCCH' (see
38.214, section FFS_Section)
    tci-StatesPDCCH                   SEQUENCE(SIZE (1..maxNrofTCI-StatesPDCCH)) OF TCI-
StateId             OPTIONAL, -- If at least spatial QCL is configured/indicated, this field indicates if TCI field is
present or not present in DL-related DCI.
    -- When the field is absent the UE considers the TCI to be absent/disabled.
    -- Corresponds to L1 parameter 'TCI-PresentInDCI' (see 38,213, section 5.1.5)
    tci-PresentInDCI                  ENUMERATED
{enabled}                                                   OPTIONAL,   -- Need S -- PDCCH DMRS scrambling initalization. Corresponds to L1 parameter 'PDCCH-DMRS-Scrambling-ID'
(see 38.214, section 5.1)
    -- When the field is absent the UE applies the value '0'.
    pdcch-DMRS-ScramblingID           BIT STRING (SIZE
(16)}                                              OPTIONAL    -- Need S
}
-- TAG-PDCCH-CONFIG-STOP
-- ASN1STOP
```

```
-- ASN1START
-- TAG-TCI-STATE-START

TCI-State ::=              SEQUENCE {
    tci-StateId                TCI-StateId,
    qcl-Type1                  QCL-Info,
    qcl-Type2                  QCL-Info                                                          OPTIONAL
}

TCI-StateId ::=            INTEGER (0..ffsValue)

QCL-Info ::=               SEQUENCE {
    referenceSignal            CHOICE {
        csi-rs                     NZP-CSI-RS-ResourceConfigId,
        ssb                        SSB-Id,
        -- A TRS (Tracking Reference Signal) configuration represented as a set of CSI-RS-Resources in a NZP-CSI-ResourceSetId
        trs                        NZP-CSI-ResourceSetId
    },
    qcl-Type                   ENUMERATED {typeA, typeB, typeC, typeD},
    ...
}

-- TAG-TCI-STATE-STOP
```

METHOD AND APPARATUS FOR PDCCH MONITORING IN A WIRELESS COMMUNICATION SYSTEM

CROSS-REFERENCE TO RELATED APPLICATIONS

The present application claims the benefit of U.S. Provisional Patent Application Ser. No. 62/646,719 filed on Mar. 22, 2018, the entire disclosure of which is incorporated herein in its entirety by reference.

FIELD

This disclosure generally relates to wireless communication networks, and more particularly, to a method and apparatus for physical downlink control channel (PDCCH) monitoring in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), a signal to configure the UE to perform a Random Access Channel-less (RACH-less) handover to a second cell may be received in a first cell, wherein the signal comprises a candidate list of beams for Physical Downlink Control Channel (PDCCH) monitoring in the second cell and/or the signal is indicative of a first beam of the candidate list of beams (to be used by the UE for PDCCH monitoring). A PDCCH in the second cell on the first beam may be monitored before receiving a Medium Access Control (MAC) Control Element (CE) assigning a second beam for PDCCH monitoring in the second cell.

BRIEF DESCRIPTION OF THE DRAWINGS

FIG. 6A illustrates a first portion of an exemplary MobilityControlInfo information element.

FIG. 6B illustrates a second portion of an exemplary MobilityControlInfo information element.

FIG. 7 illustrates an exemplary UE-EUTRA-Capability information element.

FIG. 8 illustrates a table associated with exemplary radio access latency components during handover.

FIG. 10 illustrates a table associated with second exemplary radio access latency components during Make-Before-Break and/or Random Access Channel-less (RACH-less) handover.

FIG. 13 illustrates an exemplary RRCReconfiguration message.

FIG. 14 illustrates an exemplary RRCReconfigurationComplete message.

FIG. 15A illustrates a first portion of an exemplary CellGroupConfig IE.

FIG. 15B illustrates a second portion of an exemplary CellGroupConfig IE.

FIG. 16A illustrates a first portion of an exemplary ServingCellConfig IE.

FIG. 16B illustrates a second portion of an exemplary ServingCellConfig IE.

FIG. 17A illustrates a first portion of an exemplary PDCCH-Config IE.

FIG. 17B illustrates a second portion of an exemplary PDCCH-Config IE.

FIG. 17C illustrates a third portion of an exemplary PDCCH-Config IE.

FIG. 17D illustrates a fourth portion of an exemplary PDCCH-Config IE.

FIG. 18 illustrates an exemplary TCI-State IE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 36.300 V15.0.0, "Evolved Universal Terrestrial Radio Access (E-UTRA) and Evolved Universal Terrestrial Radio Access Network (E-UTRAN)", Overall description, Stage 2; 3GPP TS 36.321 V15.0.0, "Evolved Universal Terrestrial Radio Access (E-UTRA)", Medium Access Control (MAC) protocol specification; 3GPP TS 36.331 V15.0.1, "Evolved Universal Terrestrial Radio Access (E-UTRA)", Radio Resource Control (RRC), Protocol specification; R2-1802401 "Report of the email discussion on the 0 ms handover interruption time requirement from IMT2020", ZTE Corporation; R2-162366, "Beam Forming Impacts", Nokia and Alcatel-Lucent; R2-163716, "Discussion on terminology of beamforming based high frequency NR", Samsung; R2-162709, "Beam support in NR", Intel; 3GPP RAN2 #94 meeting minute; 3GPP TR 38.802 V14.1.0, "Study on New Radio Access Technology Physical Layer Aspects"; 3GPP TS 38.300 V15.0.0, NR, "NR and NG-RAN Overall Description", Stage 2; R2-1803796, "Introduction of MAC CEs for NR MIMO"; R2-1803552, "Draft CR to 38331 after RAN2 AH 1801". The standards and documents listed above are hereby expressly incorporated by reference in their entirety.

Figure 1:
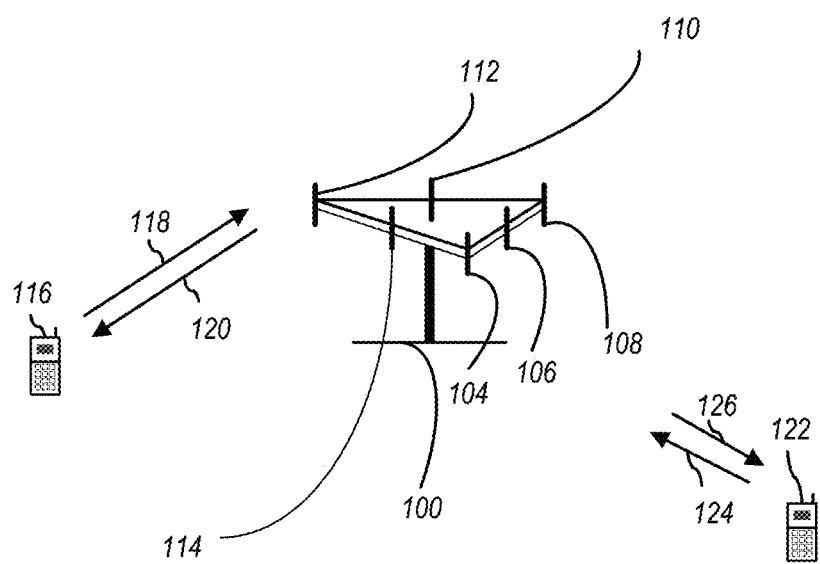
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
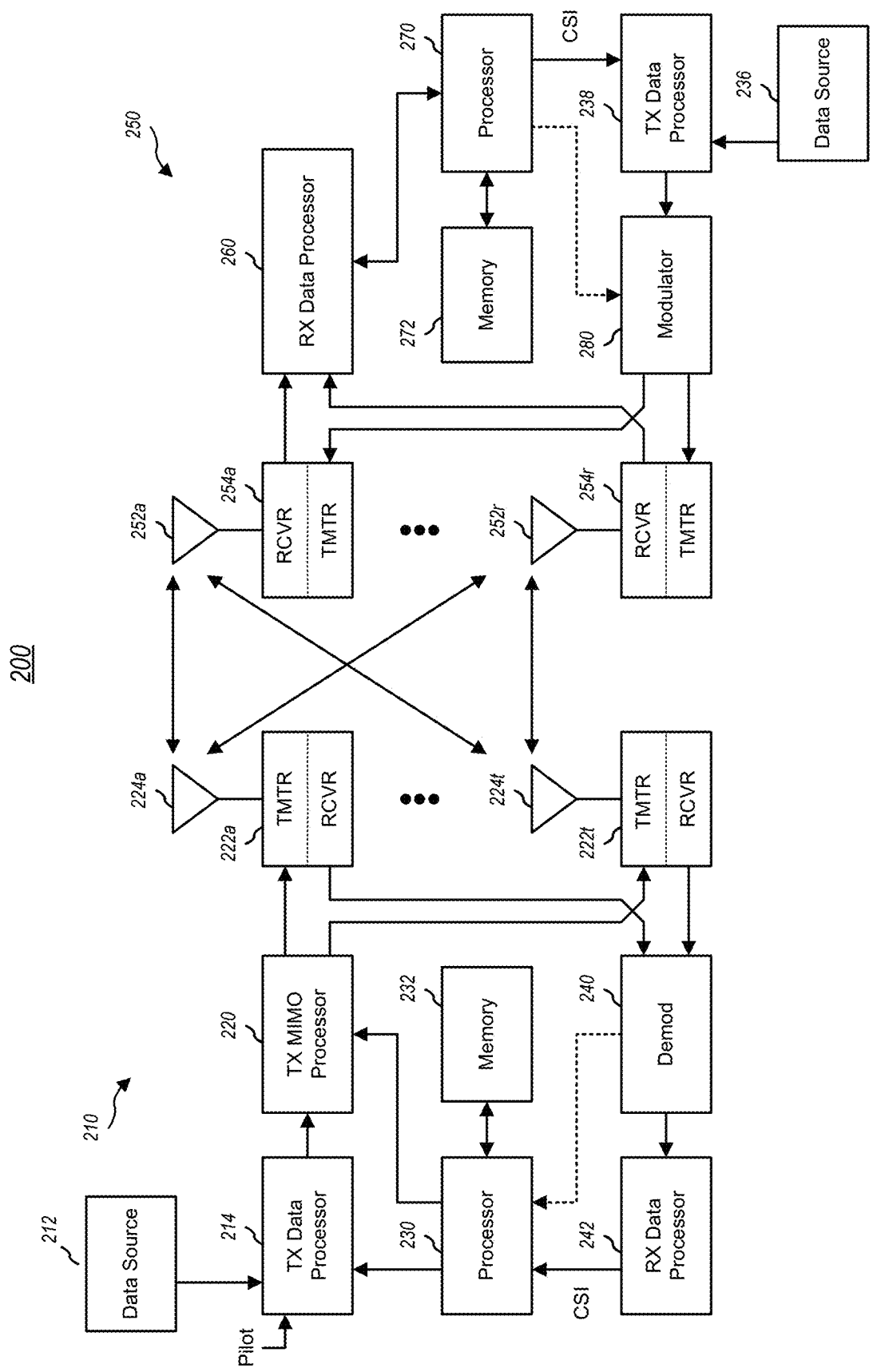
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which pre-coding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
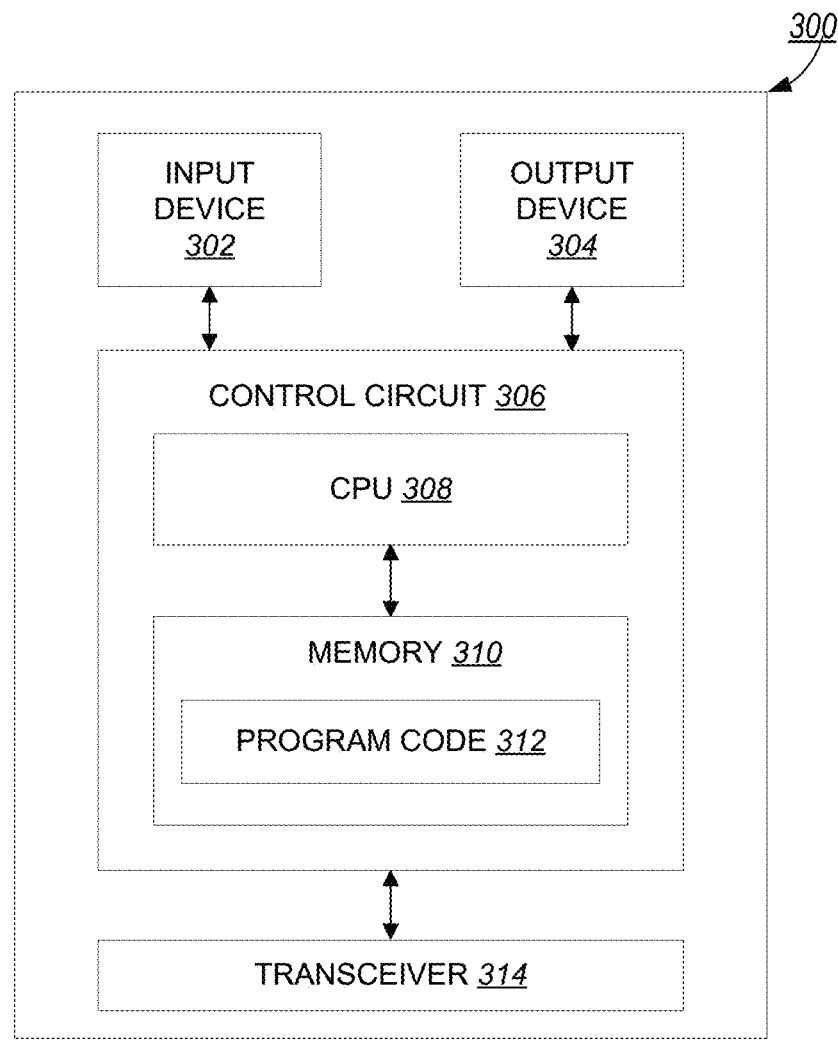
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
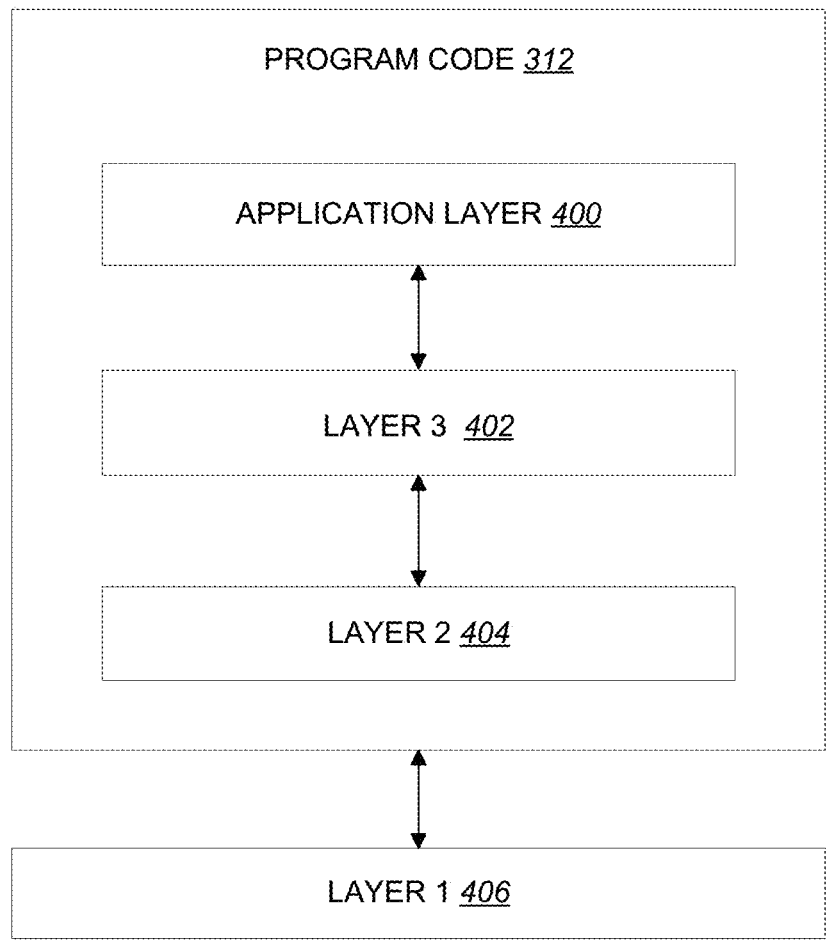
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

3GPP TS 36.300 V15.0.0, provides information associated with one or more Random Access Channel-less (RACH-less) mechanisms and/or one or more RACH-less procedures (e.g., handover (HO) procedure, Control Plane (C-Plane) handling and change of Secondary eNB (SeNB). It may be appreciated that eNB may refer to Evolved Universal Mobile Telecommunications System (UMTS) Terrestrial Radio Access Network (E-UTRAN) NodeB. RACH-less HO and/or change of SeNB may be associated with skipping (and/or not performing) one or more random access procedures during HO and/or during change of SeNB. With RACH-less HO, only timing adjustment indication, NTA=0 and/or reuse NTA from a source eNB, are allowed. NTA denotes a parameter defined in 3GPP TS 36.213 and 3GPP TS 36.211. In some examples, NTA may be an indication of a timing offset between uplink and downlink radio frames.

An intra E-UTRAN HO of a UE in an RRC_CONNECTED state (e.g., connected state) is a UE-assisted network controlled HO. HO preparation signaling in E-UTRAN may be associated with various characteristics. For example, part of an HO command may come from a target eNB and may be transparently forwarded to the UE by the source eNB. To prepare the HO, the source eNB passes necessary information to the target eNB (e.g., the necessary information may comprise E-UTRAN Radio Access Bearer (E-RAB) attributes and/or Radio Resource Control (RRC) context). For example, when Carrier Aggregation (CA) is configured and/or to enable Secondary Cell (SCell) selection in the target eNB, the source eNB may provide a list of cells (e.g., best cells), where cells of the list of cells may be ordered in the list of cells in decreasing (and/or increasing) order of radio quality. Optionally, the list of cells may be indicative of measurement results of the cells. When Dual Connectivity (DC) is configured, a source Master eNB (MeNB) may provide a Secondary Cell Group (SCG) configuration and/or a Master Cell Group (MCG) configuration to a target MeNB.

In some examples, the source eNB and/or the UE may keep some context (e.g., Cell Radio Network Temporary Identifier (C-RNTI)) to enable the return of the UE in case of HO failure. If RACH-less HO is not configured, the UE may access a target cell via RACH following a contention-free procedure using a dedicated RACH preamble and/or following a contention-based procedure if dedicated RACH preambles are not available. The UE may use the dedicated preamble until the HO procedure is finished (e.g., successfully finished and/or unsuccessfully finished).

If RACH-less HO is configured, the UE may access the target cell via an uplink grant pre-allocated to the UE in an RRC message. If the UE does not receive the (pre-allocated) uplink grant in the RRC message from the source eNB, the UE may monitor a Physical Downlink Control Channel (PDCCH) of the target cell. If the access towards the target cell (using RACH and/or RACH-less procedure) is not successful within a certain time (window), the UE may initiate radio link failure recovery using a suitable cell. Robust Header Compression (ROHC) context may not be transferred at HO. Alternatively and/or additionally, ROHC context may be kept at HO within the same eNB.

In some examples, a preparation and/or an execution phase of the HO procedure may be performed without Evolved Packet Core (EPC) involvement (e.g., preparation message may be exchanged directly between eNBs). The release of resources at a source side during an HO completion phase may be triggered by the eNB. In cases where a Relay Node (RN) is involved, a Donor eNB (DeNB) associated with the RN may relay (appropriate) 51 messages between the RN and a Mobility Management Entity (MME) (e.g., S1-based HO). Alternatively and/or additionally, the DeNB may relay X2 messages between the RN and the target eNB (X2-based HO). The DeNB may be explicitly aware of the UE attached to the RN due to one or more S1 proxy functionalities and/or one or more X2 proxy functionalities.

Figure 5:
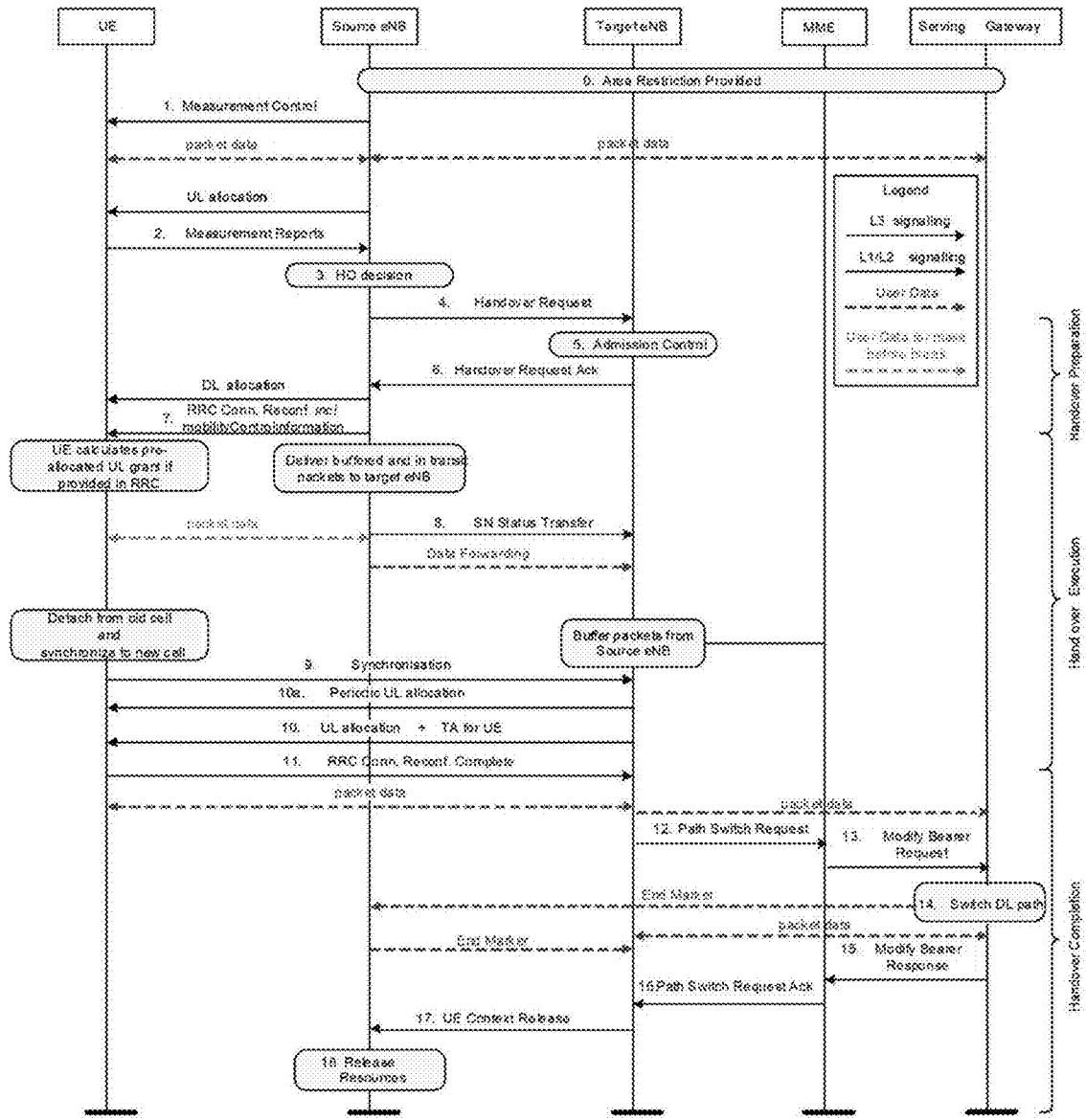
FIG. 5 illustrates an exemplary HO scenario wherein a Mobility Management Entity (MME) and/or a Serving Gateway do not change.

FIG. 5 illustrates an exemplary HO scenario 500 wherein an MME and/or a Serving Gateway do not change. At "0. Area Restriction Provided", UE context within the source eNB comprises information associated with roaming and/or access restrictions which may be provided at connection establishment and/or at a previous Timing Alignment (also known as Timing Advance) (TA) update. At "1. Measurement Control", the source eNB configures the UE measurement procedures according to the information associated with roaming and/or access restrictions (e.g., and available multiple frequency band information). Measurements provided by the source eNB may assist the function controlling the UE's connection mobility. At "2. Measurement Reports", a measurement report (e.g., a MEASUREMENT REPORT) may be triggered and/or sent to the source eNB. At "3. HO decision", the source eNB may make a decision based upon the measurement report and/or Radio Resource Management (RRM) information to hand off to the UE.

At "4. Handover Request", the source eNB may issue a HANDOVER REQUEST message to the target eNB passing necessary information to prepare the HO at the target side (e.g., UE X2 signaling context reference at source eNB, UE S1 EPC signaling context reference, target cell ID, eNB key (KeNB), RRC context comprising the C-RNTI of the UE in the source eNB, AS-configuration, E-RAB context, and/or physical layer identification (ID) of the source cell and/or short Message Authentication Code (MAC-I) for possible Radio Link Failure (RLF) recovery). UE X2/UE S1 signaling references may enable the target eNB to address the source eNB and the EPC. The E-RAB context may include (necessary) Radio Network Layer (RNL) and/or Transport Network Layer (TNL) addressing information and/or Quality of Service (QoS) profiles of the E-RABs.

At "5. Admission Control", Admission Control may be performed by the target eNB dependent on received E-RAB QoS information to increase a likelihood of a successful HO, if resources can be granted by target eNB. The target eNB configures required resources according to the received E-RAB QoS information and reserves a C-RNTI and optionally an RACH preamble. The AS-configuration to be used in the target cell can either be specified independently (i.e. an "establishment") or as a delta compared to the AS-configuration used in the source cell (i.e. a "reconfiguration").

At "6. Handover Request Ack", the target eNB prepares HO with L1/L2 and/or sends a HANDOVER REQUEST ACKNOWLEDGE message to the source eNB. The HANDOVER REQUEST ACKNOWLEDGE message includes a transparent container to be sent to the UE as an RRC message to perform the HO. The container may comprise a new C-RNTI, one or more target eNB security algorithm identifiers for selected security algorithms, a dedicated RACH preamble, and/or some other parameters (e.g., access parameters, System Information Blocks (SIBs), etc.). If RACH-less HO is configured, the container may include a timing adjustment indication and optionally a pre-allocated uplink grant. The HANDOVER REQUEST ACKNOWLEDGE message may also include RNL/TNL information for forwarding tunnels (if necessary). Responsive to the source eNB receiving the HANDOVER REQUEST ACKNOWLEDGE message and/or responsive to transmission of an HO command being initiated in downlink, data forwarding may be initiated.

In some examples, one or more of steps 7 through 16 may reduce data loss during HO. At "7. RRC Conn. Reconf, incl. mobilityControlInformation", the target eNB may generate an RRC message associated with performing the HO (e.g., the RRC message may comprise an instruction to perform operations associated with the HO). The RRC message may be an RRCConnectionReconfiguration message including mobilityControlInformation data. The RRC message may be sent by the source eNB to the UE. The source eNB may perform necessary integrity protection and/or ciphering of the RRC message.

The UE may receive the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the HO. If RACH-less HO is configured, the RRCConnectionReconfiguration message may include a timing adjustment indication and optionally a pre-allocated uplink grant for accessing the target eNB. If a pre-allocated uplink grant is not included, the UE may monitor PDCCH of the target eNB to receive an uplink grant. The UE does not need to delay HO execution for delivering the Hybrid Automatic Repeat Request (HARQ)/Automatic Repeat Request (ARQ) responses to the source eNB.

If Make-Before-Break HO is configured, the connection to the source cell is maintained after reception of the RRCConnectionReconfiguration message with the mobilityControlInformation data before the UE executes initial uplink transmission to the target cell. Alternatively and/or additionally, if Make-Before-Break HO is configured, the source eNB may decide when to stop transmitting to the UE. Alternatively and/or additionally, the UE may be configured with Make-Before-Break HO and RACH-less HO, simultaneously.

At "8. SN Status Transfer", the source eNB may send an SN STATUS TRANSFER message to the target eNB to convey uplink Packet Data Convergence Protocol (PDCP) Sequence Number (SN) receiver status and/or downlink PDCP SN transmitter status of E-RABs for which PDCP status preservation applies (i.e. for Radio Link Control (RLC) Acknowledgment Mode (AM)). The uplink PDCP SN receiver status may comprise at least the PDCP SN of a first missing uplink (UL) Service Data Unit (SDU) and/or may comprise a bit map of the receiver status of out of sequence UL SDUs that the UE needs to retransmit in the target cell, if there are any such SDUs. The downlink PDCP SN transmitter status indicates a next PDCP SN that the target eNB shall assign to new SDUs, not having a PDCP SN yet. The source eNB may omit sending this message if none of the E-RABs of the UE shall be treated with PDCP status preservation.

At "9. Synchronisation", if RACH-less HO is not configured, after receiving the RRCConnectionReconfiguration message including the mobilityControlInformation, the UE may perform synchronization to the target eNB and/or may access the target cell via RACH, following a contention-free procedure if a dedicated RACH preamble is indicated in the mobilityControlInformation, or following a contention-based procedure if no dedicated preamble is indicated in the mobilityControlInformation. The UE may device target eNB specific keys and configures (selected) security algorithms to be used in the target cell. Alternatively and/or additionally, if RACH-less HO is configured, theUE performs synchronization to the target eNB. The UE may derive target eNB specific keys and/or may configure the (selected) security algorithms to be used in the target cell. Alternatively and/or additionally, if RACH-less HO is configured, the UE may performs synchronization to the target eNB. The UE may derive target eNB specific keys and may configure the (selected) security algorithms to be used in the target cell At "10. UL allocation+TA for UE", if RACH-less HO is not configured, the target eNB may respond with UL allocation and/or timing advance. At "10a. Periodic UL allocation", if RACH-less HO is configured and/or the UE did not get the periodic pre-allocated uplink grant in the RRCConnectionReconfiguration message including the mobilityControlInfo, the UE may receive an uplink grant via the PDCCH of the target cell. The UE may use the first available uplink grant after synchronization to the target cell.

At "11. RRC Conn. Reconf. Complete", when the RACH-less HO is not configured and/or the UE has successfully accessed the target cell, the UE sends the RRCConnectionReconfigurationComplete message (C-RNTI) to confirm the HO, along with an uplink Buffer Status Report, whenever possible, to the target eNB, which indicates that the HO procedure is completed for the UE. The target eNB verifies the C-RNTI sent in the RRCConnectionReconfigurationComplete message. The target eNB may begin sending data to the UE. Alternatively and/or additionally, when the RACH-less HO is configured, after the UE has received uplink grant, the UE sends the RRCConnectionReconfigurationComplete message (C-RNTI) to confirm the HO, along with an uplink Buffer Status Report, whenever possible, to the target eNB. The target eNB verifies the C-RNTI sent in the RRCConnectionReconfigurationComplete message. The target eNB may begin sending data to the UE. The HO procedure may be completed for the UE when the UE receives the UE contention resolution identity Medium Access Control (MAC) control element (CE) from the target eNB.

At "12. Path Switch Request", the target eNB may send a PATH SWITCH REQUEST message to the MME indicative of the UE changing cells. At "13. Modify Bearer Request", the MME may send a MODIFY BEARER REQUEST message to the Serving Gateway. At "14. Switch DL path", the Serving Gateway may switch a downlink data path to the target side. The Swerving Gateway may send one or more "end marker" packets on the old path to the source eNB and then can release any U-plane/TNL resources towards the source eNB. At "15. Modify Bearer Response" the Serving Gateway may send a MODIFY BEARER RESPONSE message to the MME. At "16. Path Switch Request Ack", the MME may confirm a PATH SWITCH REQUEST message with a PATCH SWITCH REQUEST ACKNOWLEDGE message. At "17. UE Context Release", by sending a UE CONTEXT RELEASE message, the target eNB informs success of HO to source eNB and/or triggers release of resources by the source eNB. The target eNB may send this message after the PATH SWITCH REQUEST ACKNOWLEDGE message is received from the MME. At "18. Release Resources", responsive reception of the UE CONTEXT RELEASE message, the source eNB may release radio and C-plane related resources associated with the UE context. Ongoing data forwarding may continue.

When an X2 HO is used involving Home eNBs (HeNBs) and/or when a source HeNB is connected to an HeNB Gateway (HeNB GW), a UE CONTEXT RELEASE REQUEST message including an explicit GW Context Release Indication may be sent by the source HeNB, in order to indicate that the HeNB GW may release of all the resources related to the UE context.

3GPP TS 36.331 V15.0.0 provides information associated with one or more RACH-less (e.g., RACH skip) mechanisms. In DC, an SCG can be established, reconfigured and/or released by using an RRCConnectionReconfiguration message with or without a mobilityControlInfo. In case Random Access to a Primary Secondary Cell (PSCell) or initial Physical Uplink Shared Channel (PUSCH) transmission to the PSCell if rach-SkipSCG is configured is required upon SCG reconfiguration, E-UTRAN employs the SCG change procedure (i.e. an RRCConnectionReconfiguration message including the mobilityControlInfoSCG). The PSCell can only be changed using the SCG change procedure and/or by release and/or addition of the PSCell.

After receiving an HO message, the UE may attempt to access a target Primary Cell (PCell) at a first available RACH occasion according to Random Access resource selection defined in 3GPP TS 36.321 V15.0.0, i.e. the HO is asynchronous, and/or at the first available PUSCH occasion if RACH-Skip is configured. Consequently, when allocating a dedicated preamble for the random access in the target PCell, Evolved UMTS Terrestrial Radio Access (E-UTRA) shall ensure the first available PUSCH occasion is available from the first RACH occasion the UE may use. The first available PUSCH occasion is provided by ul-ConfigInfo, if configured, otherwise UE shall monitor the PDCCH of a target eNB. Upon successful completion of the HO, the UE sends a message used to confirm the HO.

In some examples, the RRCConnectionReconfiguration message may comprise the mobilityControlInfo and/or the UE is able to comply with a configuration included in the RRCConnectionReconfiguration message. If the RRCConnectionReconfiguration message comprises the mobilityControlInfo and/or the if the UE is able to comply with the configuration, the UE may perform one or more operations, which may include one or more of: stop timer T310, if running; stop timer T312, if running; start timer T304 with the timer value set to t304, as included in the mobilityControlInfo; stop timer T370, if running; if carrierFreq is included, consider the target PCell to be one on the frequency indicated by the carrierFreq with a physical cell identity indicated by the targetPhysCellId; if carrierFreq is not included, consider the target PCell to be one on the frequency of the source PCell with a physical cell identity indicated by the targetPhysCellId; start synchronising to a downlink (DL) of the target PCell (e.g., the UE may perform the HO as soon as possible following the reception of the RRC message triggering the HO, which may be before confirming successful reception (HARQ and ARQ) of the RRC message); if the received RRCConnectionReconfiguration message includes an rach-Skip, configure lower layers to apply the rach-Skip for the target MCG; configure lower layers in accordance with any additional fields, that may not be covered in previous operations, if included in the received mobilityControlInfo;

FIGS. 6A-6B illustrate an exemplary MobilityControlInfo information element 600. In some examples, an rach-Skip field associated with the exemplary MobilityControlInfo information element 600 may indicate whether random access procedure for the target PCell is skipped. Alternatively and/or additionally, an rach-SkipSCG field associated with the exemplary MobilityControlInfo information element 600 may indicate whether random access procedure for the target PSCell is skipped. Alternatively and/or additionally, a targetTA field associated with the exemplary MobilityControlInfo information element 600 may refer to the timing adjustment indication, (described in 3GPP TS 36.213, indicating the NTA value which the UE shall use for the target Primary Timing Advance Group (PTAG) of HO or the target Secondary Timing Advance Group (STAG) of SCG change. ta0 corresponds to NTA=0. mcg-PTAG corresponds to the latest NTA value of the PTAG associated with MCG. scg-PTAG corresponds to the latest NTA value of the PTAG associated with SCG. mcg-STAG corresponds to the latest NTA value of a MCG STAG indicated by the STAG-Id. scg-STAG corresponds to the latest NTA value of a SCG STAG indicated by the STAG-Id.

FIG. 7 illustrates an exemplary UE-EUTRA-Capability information element 700. In some examples, an rach-less field associated with the exemplary UE-EUTRA-Capability information element 700 may indicate whether the UE supports RACH-less HO, and/or whether the UE which indicates dc-Parameters supports RACH-less SeNB change.

3GPP R2-1802401 provides information associated with one or more HO mechanisms (e.g., 0 ms HO associated with Radio Access Technology (RAT) and/or New RAT (NR)). In a typical LTE HO, the UE may stop communication with the source cell upon receiving an HO command. So, from the perspective of service transmission, the data disruption starts from the receiving of the HO command until the UE transmits/receives the first packet to/from the target cell. A service interruption time in HO (i.e. the HO interruption) is defined as a duration between the time when UE stops transmission/reception with the source eNB and a time when the target eNB resumes transmission/reception with the UE. FIG. 8 illustrates a table 800 associated with exemplary radio access latency components during HO. An exemplary total HO interruption in an exemplary LTE HO may be between 45.5 and 49.5 ms (milliseconds) (and/or a different value).

Figure 9:
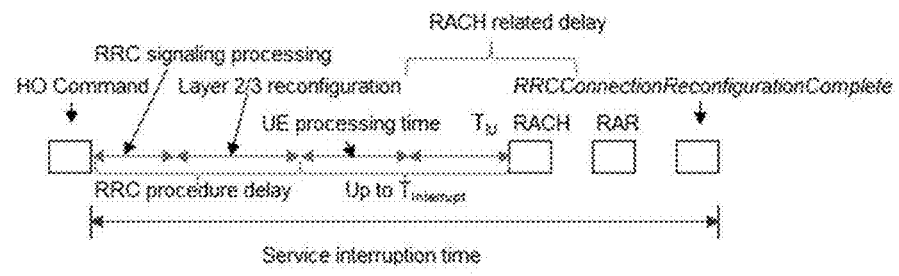
FIG. 9 illustrates components of handover interruption time in an exemplary handover.

FIG. 9 illustrates components 900 of HO interruption time in an exemplary LTE HO. A WI on further mobility enhancements in LTE was established in LTE R14. Make-Before-Break (MBB) and/or RACH-less HO were introduced to reduce HO interruption time. With the adoption of MBB, the connection to the source cell is maintained with the reception of the HO command until the UE executes initial uplink transmission/reception to/from the target cell. So the latency of RRC procedure delay is considered to be 0 ms in MBB. The UE re-establishes user plane immediately before the UE turns to target cell and by proper software design re-establishment of the user plane could be done in parallel with data transmission/reception in the source side i.e. re-establishment of the user plane could take 0 ms also. The UE processing time during the HO (TUE_process) could be reduced down to 5 ms within R14 time frame. In theory UE processing time could be 0 ms too for intra-frequency case at least, if the source and the target cell are completely synchronized with same bandwidth and thus no RF tuning is needed. The current 5 ms value was decided as a relaxed requirement to simplify the UE RF design, so that maybe some note could be added to clarify how/under which conditions 0 ms could be achieved. Furthermore, with the adoption of RACH-less HO, the UE could access the target cell via the uplink grant pre-allocated in the HO command, so the processing time in steps 9.3, 9.4 and 10 could be skipped. The RRC Connection Reconfiguration Complete will be ready and sent within the pre-allocated uplink grant, therefore processing time could be reduced.

FIG. 10 illustrates a second table 1000 associated with second exemplary radio access latency components during MBB and/or RACH-less HO. The MBB and RACH-less HO optimizations can be configured to the UE simultaneously. A total HO interruption time in LTE can be reduced down to 0 ms.

For the intra-frequency case, under the assumption of a dual Reception (RX) UE (with independent Radio Frequency (RF) chains), with the combination of MBB and RACH-less HO, the HO interruption time in LTE can be reduced down to 0 ms (in the scenarios where RACH-less HO is applicable, i.e. no/negligible UE TA difference between the source and the target cell).

For the intra-frequency case, under the assumption of a dual RX UE (with independent RF chains), with the combination of MBB and RACH-less HO, the HO interruption time in NR can be reduced down to 0 ms (in the scenarios where RACH-less HO is certainly applicable, i.e. the lower frequency case with no/negligible UE TA difference between the source and the target cell).

For the inter-frequency case, under the assumption that the UE can simultaneously transmit/receive in the source and in the target cells, with the combination of MBB and RACH-less HO, the HO interruption time in both LTE and NR can be reduced down to 0 ms (in the scenarios where RACH-less HO is applicable).

In 3GPP TS 38.300 v15.0.0, information associated with RRM measurements (e.g., beam measurement) is provided. In RRC_CONNECTED, the UE measures multiple beams (at least one) of a cell and measurements results (power values) are averaged to derive a cell quality. In doing so, the UE is configured to consider a subset of detected beams: the N best beams above an absolute threshold. Filtering takes place at two different levels: at the physical layer to derive beam quality and at RRC level to derive cell quality from multiple beams. Cell quality from beam measurements is derived in the same way for one or more serving cells and for one or more non-serving cells. Measurement reports may comprise measurement results of the X best beams if the UE is configured to do so by the gNB.

Figure 11:
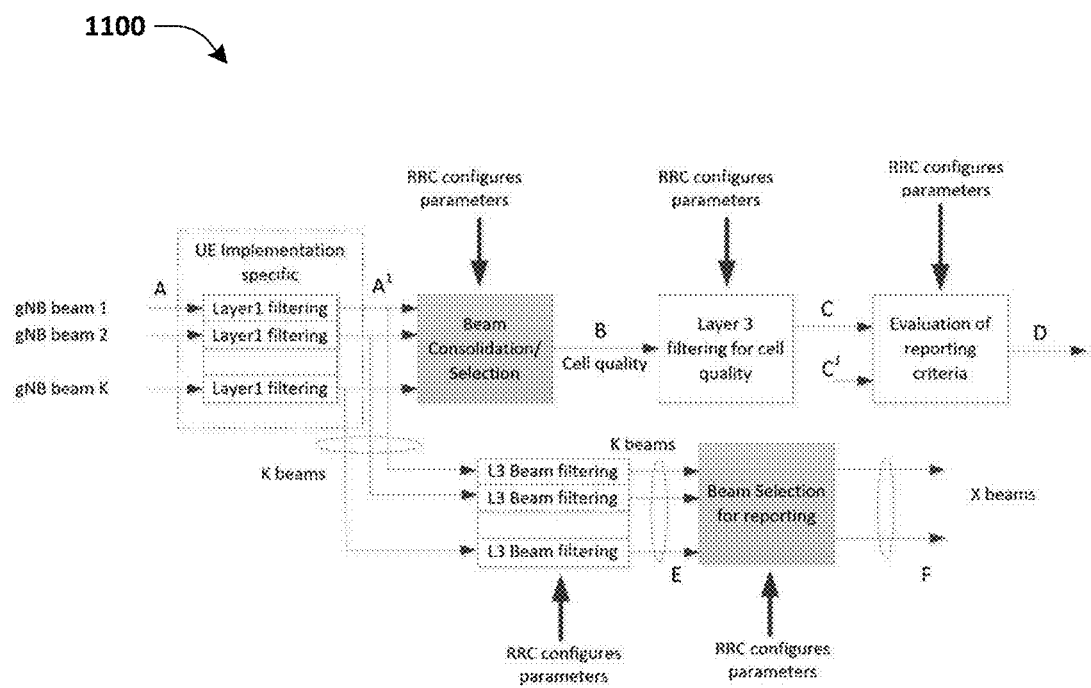
FIG. 11 illustrates a high-level diagram of an exemplary measurement model.

FIG. 11 illustrates a high-level diagram 1100 of an exemplary measurement model. One or more signals A may correspond to measurements (beam specific samples) internal to the physical layer. Layer 1 filtering may correspond to internal layer 1 filtering of the inputs measured at point A. Exact filtering is implementation dependent. How the measurements are actually executed in the physical layer by an implementation (inputs A and Layer 1 filtering) in not constrained by the standard. One or more signals $A^1$ may correspond to measurements (i.e. beam specific measurements) reported by layer 1 to layer 3 after layer 1 filtering. Beam Consolidation/Selection may correspond to beam specific measurements being consolidated to derive cell quality if N>1, else when N=1 the best beam measurement is selected to derive cell quality. Behavior of the Beam Consolidation/Selection is standardized and/or the configuration of this module is provided by RRC signaling. Reporting period at B equals one measurement period at $A^1$.

One or more signals B may correspond to a measurement (i.e. cell quality) derived from beam-specific measurements reported to layer 3 after beam consolidation/selection. Layer 3 filtering for cell quality may correspond to performing filtering on the measurements associated with the one or more signals B. Behavior of the Layer 3 filters is standardized and the configuration of the layer 3 filters is provided by RRC signaling. Filtering reporting period associated with one or more signals C equals one measurement period associated with the one or more signals B. One or more signals C may correspond to a measurement after processing in the layer 3 filter. A reporting rate associated with the one or more signals C may identical to a reporting rate associated with the one or more signals B. This measurement is used as an input for one or more evaluations of reporting criteria.

Evaluation of reporting criteria may correspond to checking whether actual measurement reporting associated with one or more signals D is necessary. The evaluation can be based on more than one flow of measurements at a reference point associated with the one or more signals C (e.g., to compare between different measurements). This is illustrated by the one or more signals C and/or one or more signals C1. The UE shall evaluate reporting criteria each time a new measurement result is reported (e.g., using the one or more signals C and/or the one or more signals C1). The reporting criteria are standardized and the configuration is provided by RRC signaling (e.g., UE measurements).

One or more signals D may be associated with a measurement report information (e.g., message) sent on the radio interface. L3 Beam filtering may be associated with filtering performed on the measurements (i.e. beam specific measurements) associated with the one or more signals $A^1$. Behavior of beam filters is standardized and the configuration of the beam filters is provided by RRC signaling. Filtering reporting period associated with one or more signals E equals one measurement period associated with the one or more signals $A^1$. The one or more signals E may be associated with a measurement (i.e. beam-specific measurement) after processing in the beam filters. A reporting rate associated with the one or more signals E equals is identical to a reporting rate associated with the one or more signals $A^1$. This measurement is used as input for selecting the X measurements to be reported.

Beam Selection for beam reporting is associated with selecting the X measurements from the measurements provided at point E. The behavior of the beam selection is standardized and the configuration of this module is provided by RRC signaling. One or more signals F may be associated with beam measurement information included in a measurement report (sent) on the radio interface.

Layer 1 filtering introduces a certain level of measurement averaging. How and when the UE performs required measurements is implementation specific to the point that the one or more signals B fulfils performance requirements set in 3GPP TS 38.133. Layer 3 filtering for cell quality and related parameters used are specified in 3GPP TS 38.331 and does not introduce any delay in the sample availability between B and C. Measurement associated with the one or more signals C and/or the one or more signals C1 is used in event evaluation. L3 Beam filtering and related parameters used are specified in 3GPP TS 38.331 and do not introduce any delay in sample availability between the one or more signals E and the one or more signals F.

Measurement reports may include the measurement identity of the associated measurement configuration that triggered the reporting. Alternatively and/or additionally, cell and beam measurement quantities to be included in measurement reports are configured by the network. Alternatively and/or additionally, the number of non-serving cells to be reported can be limited through configuration by the network. Alternatively and/or additionally, cells belonging to a blacklist configured by the network are not used in event evaluation and reporting, and conversely when a whitelist is configured by the network, only the cells belonging to the whitelist are used in event evaluation and reporting. Alternatively and/or additionally, beam measurements to be included in measurement reports are configured by the network (e.g., beam identifier only, measurement result and beam identifier, or no beam reporting).

3GPP R2-1803796 provides information associated with MAC CEs for NR MIMO. In some examples, a network may indicate a Transmission Configuration Indicator (TCI) state for PDCCH reception for a control resource set (CORESET) of a Serving Cell by sending the TCI State Indication for UE-specific PDCCH MAC CE. If a MAC entity receives a TCI State Indication for UE-specific PDCCH MAC CE on a Serving Cell, the MAC entity may indicate to lower layers, information associated with the TCI State Indication for UE-specific PDCCH MAC CE.

Figure 12:
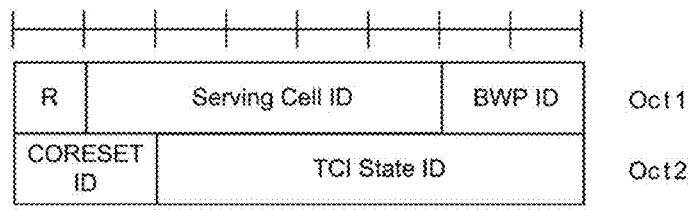
FIG. 12 illustrates a diagram of an exemplary Transmission Configuration Indicator (TCI) State indication.

FIG. 12 illustrates a diagram 1200 of an exemplary TCI State indication for UE-specific PDCCH MAC CE. A Serving Cell ID field indicates an identity of the Serving Cell for which the MAC CE applies. A length of the Serving Cell ID field is 5 bits. A BWP ID field contains a BWP-Id of a downlink bandwidth part for which the MAC CE applies. A length of the BWP ID field is 2 bits. A CORESET ID field indicates a Control Resource Set identified with ControlResourceSetId, for which the TCI State is being indicated. The length of the CORESET ID field is 2 bits. A TCI State ID field indicates the TCI state identified by TCI-StateId applicable to the Control Resource Set identified by CORESET ID field. The length of the CORESET ID field is 6 bits. An R field corresponds to a Reserved bit, set to "0".

For monitoring of a PDCCH, a network could configure the UE with a CORESET which may comprise time and/or frequency resources, and an associated search space in which UE searches for downlink control information/PDCCH candidates. In addition, the UE may be configured with a candidate list of beams (also referred to TCI state and/or SRI and/or spatial QCL assumption) corresponding to the CORESET for monitoring PDCCH. The configuration of PDCCH (e.g., PDCCH-Config) may configure the UE with a control resource set list (e.g., controlResourceSetToAddModList), and each control resource set (ControlResourceSet) may be configured with a TCI state list (tci-StatesPDCCH). The network may further indicate and/or activate a TCI state (of the configured TCI state list) for PDCCH reception for a CORESET of a Serving Cell by sending the TCI State Indication for UE-specific PDCCH MAC CE. When the UE receives a TCI State Indication for UE-specific PDCCH MAC CE on a serving cell, the UE could use the TCI state indicated by this MAC CE to monitor the PDCCH on the associated CORESET of the serving cell.

In NR, the candidate beam list (e.g. tci-StatesPDCCH), (for PDCCH of the target cell) may be configured in an HO command (RRC reconfiguration) to the UE.

An RRCReconfiguration message is a command to modify an RRC connection. The RRCReconfiguration message may convey information for measurement configuration, mobility control, radio resource configuration (including RBs, MAC main configuration and physical channel configuration) including any associated dedicated NAS information and security configuration. Alternatively and/or additionally, the RRCReconfiguration message may be associated with one or more of: Signalling radio bearer: SRB1 or SRB3; RLC-SAP: AM; Logical channel: DCCH; and/or Direction: Network to UE. FIG. 13 illustrates an exemplary RRCReconfiguration message 1300.

An RRCReconfigurationComplete message may be used to confirm the successful completion of an RRC connection reconfiguration. Alternatively and/or additionally, the RRCReconfigurationComplete message may be associated with one or more of: Signalling radio bearer: SRB1 or SRB3; RLC-SAP: AM; Logical channel: DCCH; and/or Direction: Network to UE. FIG. 14 illustrates an exemplary RRCReconfigurationComplete message 1400.

A CellGroupConfig information element (IE) is used to configure an MCG and/or an SCG. A cell group comprises a MAC entity, a set of logical channels with associated RLC entities, a PCell and/or one or more SCells. FIGS. 15A-15B illustrate an exemplary CellGroupConfig IE 1500. A logicalChannelIdentity field may correspond to a logical channel identity for UL and DL. An LCH-SetupOnly field is present if a corresponding LCH is being set up; otherwise the LCH-SetupOnly field is not present. An LCH-Setup field is present if the corresponding LCH is being set up for DRB; otherwise the LCH-Setup field is optionally present, and/or may need M. A ReconfWithSync field is present in case of SpCell change and security key change; otherwise the ReconfWithSync field is optionally present, and/or may need M. An SCellAdd field is optionally present, and/or may need M, upon SCell addition; otherwise the SCellAdd field is not present. An SCellAddMod field is present upon SCell addition; otherwise the SCellAddMod field is optionally present, and/or may need M.

A ServingCellConfig IE is used to configure (e.g., add and/or modify) the UE with a serving cell, which may be the SpCell or an SCell of an MCG or SCG. A first plurality of parameters in the ServingCellConfig IE are UE specific and/or a second plurality of parameters in the ServingCellConfig IE are cell specific (e.g. in additionally configured bandwidth parts). FIGS. 16A-16B illustrate an exemplary ServingCellConfig IE 1600.

A PDCCH-Config IE is used to configure UE specific PDCCH parameters such as CORESETs, search spaces and/or additional parameters for acquiring a PDCCH. FIGS. 17A-17D illustrate an exemplary PDCCH-Config IE 1700.

A TCI-State IE associates one or more (e.g., one, two, etc.) DL reference signals with a corresponding QCL type. FIG. 18 illustrates an exemplary TCI-State IE 1800.

Figure 19:
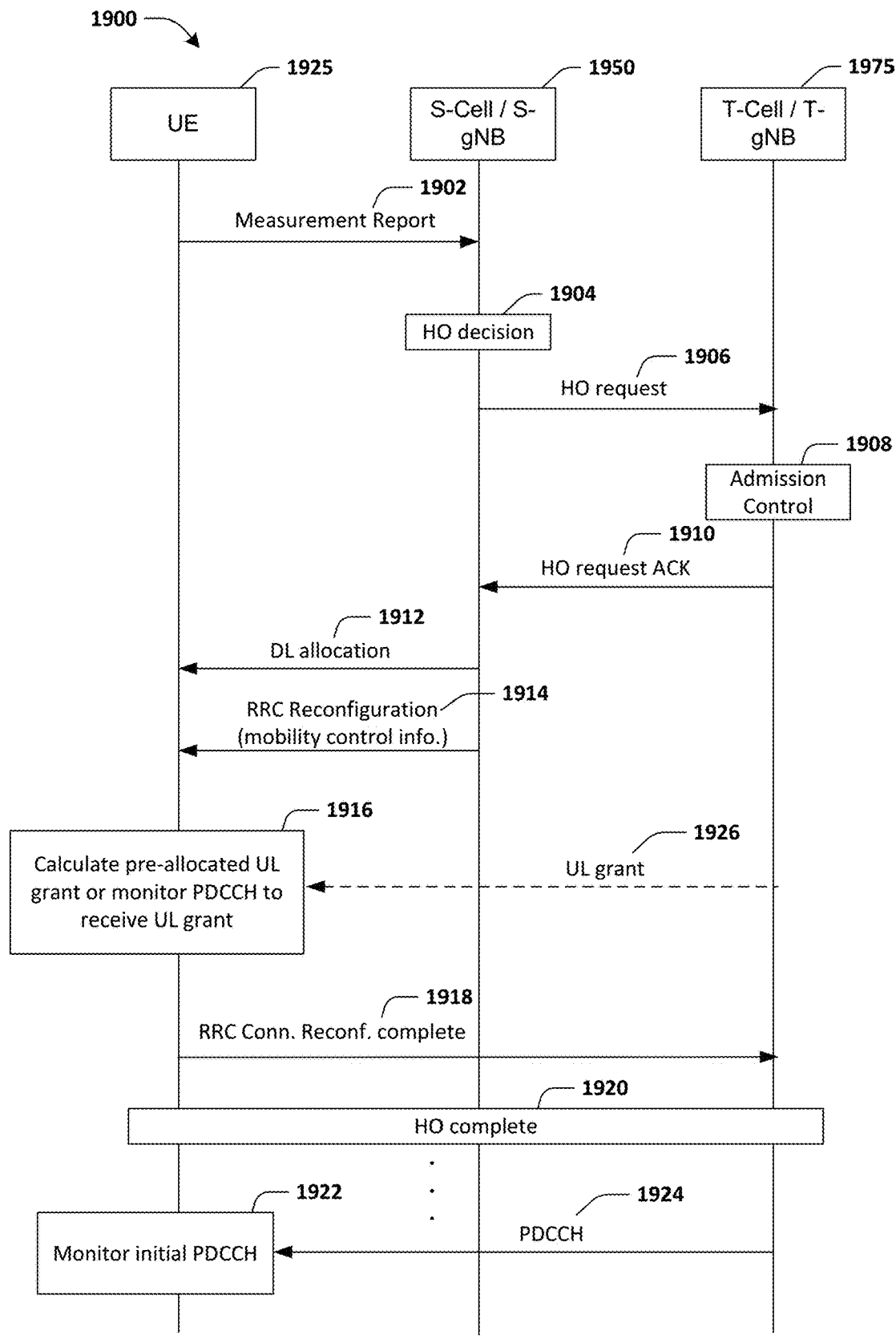
FIG. 19 illustrates examples of a system for performing an RACH-less handover procedure.

FIG. 19 illustrates examples of a system 1900 for performing an RACH-less HO procedure. In some examples, a measurement procedure associated with a UE 1925 may be configured using a source cell, S-Cell 1950 (and/or a source gNB, S-gNB). Alternatively and/or additionally, the UE 1925 may be configured to perform the RACH-less HO procedure using an RRC parameter (e.g., an rach-Less RRC parameter, an rach-Skip RRC parameter, etc.).

In some examples, the UE 1925 may trigger (and/or generate) a measurement report 1902. The measurement report 1902 may be transmitted to the S-Cell 1950. The measurement report 1902 may comprise one or more beam measurement results associated with a target cell, T-Cell 1975 (and/or a target gNB, T-gNB). For example, the measurement report 1902 may comprise one or more of a beam identifier, a Synchronization Signal Block (SSB) identifier, a CSI-RS identifier, an SSB measurement result, a CSI-RS measurement result, a TCI state, etc.

In some examples, the S-Cell 1950 may make an HO decision 1904 based upon the measurement report 1902 and/or RRM information. In some examples, the HO decision 1904 may correspond to a decision to perform an HO. Alternatively and/or additionally, the HO decision 1904 may correspond to a decision not to perform an HO.

In some examples, the S-Cell 1950 may issue (e.g., transmit) an HO request message 1906 (e.g., a HandoverPreparationInformation message) to the T-Cell 1975. For example, the HO request message 1906 may be generated by the S-Cell 1950 based upon the HO decision 1904 and/or the measurement report 1902. Alternatively and/or additionally, the HO request message 1906 may comprise information associated with (preparation of) the T-Cell 1975 performing an HO. Alternatively and/or additionally, the HO request message 1906 may comprise one or more second beam measurement results associated with the T-Cell 1975 and/or the UE 1925. In some examples, the one or more second beam measurement results may be the same as the one or more beam measurement results. Alternatively and/or additionally, the one or more second beam measurement results may be different than the one or more beam measurement results.

In some examples, the T-Cell 1975 may perform admission control 1908. For example, the admission control 1908 may be performed by configuring one or more RACH resources and/or by reserving a C-RNTI and/or an RACH preamble for the UE 1925.

In some examples, the T-Cell 1975 may prepare the HO with L1/L2 (responsive to receiving the HO request 1906 and/or performing the admission control 1908). Alternatively and/or additionally, the T-Cell 1975 may transmit an HO request ACK (HO ACK) 1910 (e.g., a HandoverCommand message) to the S-Cell 1950. In some examples, the HO ACK 1910 may comprise a timing adjustment indication (e.g., a TA indication) and/or one or more pre-allocated UL grants. The one or more pre-allocated UL grants may be associated with one or more beams.

In some examples, the T-Cell 1975 may generate an RRC reconfiguration message. Alternatively and/or additionally, the RRC reconfiguration message may comprise mobility control information associated with performing the HO. Alternatively and/or additionally, the HO ACK 1910 may comprise the RRC reconfiguration message. In some examples, the one or more pre-allocated UL grants may be one or more periodic UL resources.

In some examples, the S-Cell 1950 may transmit a DL allocation message 1912 to the UE 1925. For example, the DL allocation message 1912 may be associated with allocating DL data to the UE. In some examples, the DL data may be allocated to the UE to transmit a second RRC reconfiguration message 1914 to the UE 1925.

In some examples, the second RRC reconfiguration message 1914 may be the same as the RRC reconfiguration message (comprised within the HO ACK 1910). Alternatively and/or additionally, the second RRC reconfiguration message 1914 may be different than the RRC reconfiguration message. In some examples, the second RRC reconfiguration message 1914 may be transmitted, by the S-Cell 1950, to the UE 1925.

In some examples, one or more HO parameters (e.g., a reconfigurationWithSync parameter) may be transmitted to the UE 1925, by the S-Cell 1950, in association with the second RRC reconfiguration message 1914. For example, the one or more HO parameters and/or the second RRC reconfiguration message 1914 may be comprised within a (single) message transmitted to the UE 1925. Alternatively and/or additionally, the one or HO parameters and/or the second RRC reconfiguration message 1914 may be transmitted to the UE 1925 separately.

In some examples, the one or more HO parameters and/or the second RRC reconfiguration message 1914 may comprise a command to perform the HO (e.g., an HO command). Alternatively and/or additionally, the one or more HO parameters may comprise one or more of a new C-RNTI, one or more target gNB security algorithm identifiers, a dedicated RACH preamble, one or more target eNB SIB s, etc. Alternatively and/or additionally, the second RRC reconfiguration message 1914 may comprise the timing adjustment indication (and/or a second timing adjustment indication) and/or the one or more pre-allocated UL grants (and/or one or more second pre-allocated UL grants) for accessing the T-Cell 1975.

In some examples, the UE 1925 may perform one or more operations 1916 associated with determining one or more UL grants associated with the T-Cell 1975. In some examples, if the one or more pre-allocated UL grants (and/or the one or more second pre-allocated UL grants) for accessing the T-Cell 1975 are comprised within the second RRC reconfiguration message 1914, the one or more operations 1916 may comprise calculating the one or more pre-allocated UL grants (and/or the one or more second pre-allocated UL grants) based upon the second RRC reconfiguration message 1914. For example, if the one or more pre-allocated UL grants (and/or the one or more second pre-allocated UL grants) for accessing the T-Cell 1975 are comprised within the second RRC reconfiguration message 1914, the one or more pre-allocated UL grants (and/or the one or more second pre-allocated UL grants) may be calculated based upon the second RRC reconfiguration message 1914.

Alternatively and/or additionally, if the one or more pre-allocated UL grants (and/or the one or more second pre-allocated UL grants) are not comprised within the second RRC reconfiguration message 1914, the one or more operations 1916 may comprise monitoring a PDCCH of the T-Cell 1975 to receive one or more UL grants 1926 from the T-Cell 1975. For example, if the one or more pre-allocated UL grants (and/or the one or more second pre-allocated UL grants) are not comprised within the second RRC reconfiguration message 1914, the UE 1925 may monitor the PDCCH of the T-Cell 1975 and/or the one or more UL grants 1926 may be received from the T-Cell 1975.

In some examples, the UE 1925 may transmit an RRC reconfiguration complete message 1918 (e.g., an HO complete message) to the T-Cell 1975 using the one or more pre-allocated UL grants (and/or the one or more second pre-allocated UL grants) and/or using the one or more UL grants 1926.

For example, if the one or more pre-allocated UL grants (and/or the one or more second pre-allocated UL grants) for accessing the T-Cell 1975 are comprised within the second RRC reconfiguration message 1914, the RRC reconfiguration complete message 1918 may be transmitted to the T-Cell 1975 using the one or more pre-allocated UL grants (and/or the one or more second pre-allocated UL grants). Alternatively and/or additionally, if the one or more pre-allocated UL grants (and/or the one or more second pre-allocated UL grants) are not comprised within the second RRC reconfiguration message 1914, the RRC reconfiguration complete message 1918 may be transmitted to the T-Cell 1975 using the one or more UL grants 1926 received via PDCCH monitoring. In some examples, the RRC reconfiguration complete message 1918 may be associated with an HO confirmation corresponding to the HO.

In some examples, one or more HO complete operations 1920 may be performed. For example, the one or more HO complete operations 1920 may comprise the T-Cell 1975 verifying a C-RNTI (e.g., the new C-RNTI, a C-RNTI different than the new C-RNTI, etc.) comprised within the RRC reconfiguration complete message 1918. In some examples, the HO procedure may be completed (for the UE 1925) responsive to the one or more HO complete operations 1920 being performed.

In some examples, responsive to completion of the one or more HO complete operations 1920, the UE may monitor 1922 a (initial) PDCCH 1924 for DL and/or UL data scheduling. For example, information associated with DL and/or UL data scheduling may be received via the monitoring 1922 the PDCHH 1924.

Alternatively and/or additionally, responsive to completion of the one or more HO complete operations 1920, the UE 1925 may transmit data to the T-Cell 1975 and/or the T-Cell 1975 may receive the data from the UE 1925. Alternatively and/or additionally, responsive to completion of the one or more HO complete operations 1920, the T-Cell 1975 may transmit data to the UE 1925 and/or the UE may receive the data from the T-Cell 1975.

Figure 20:
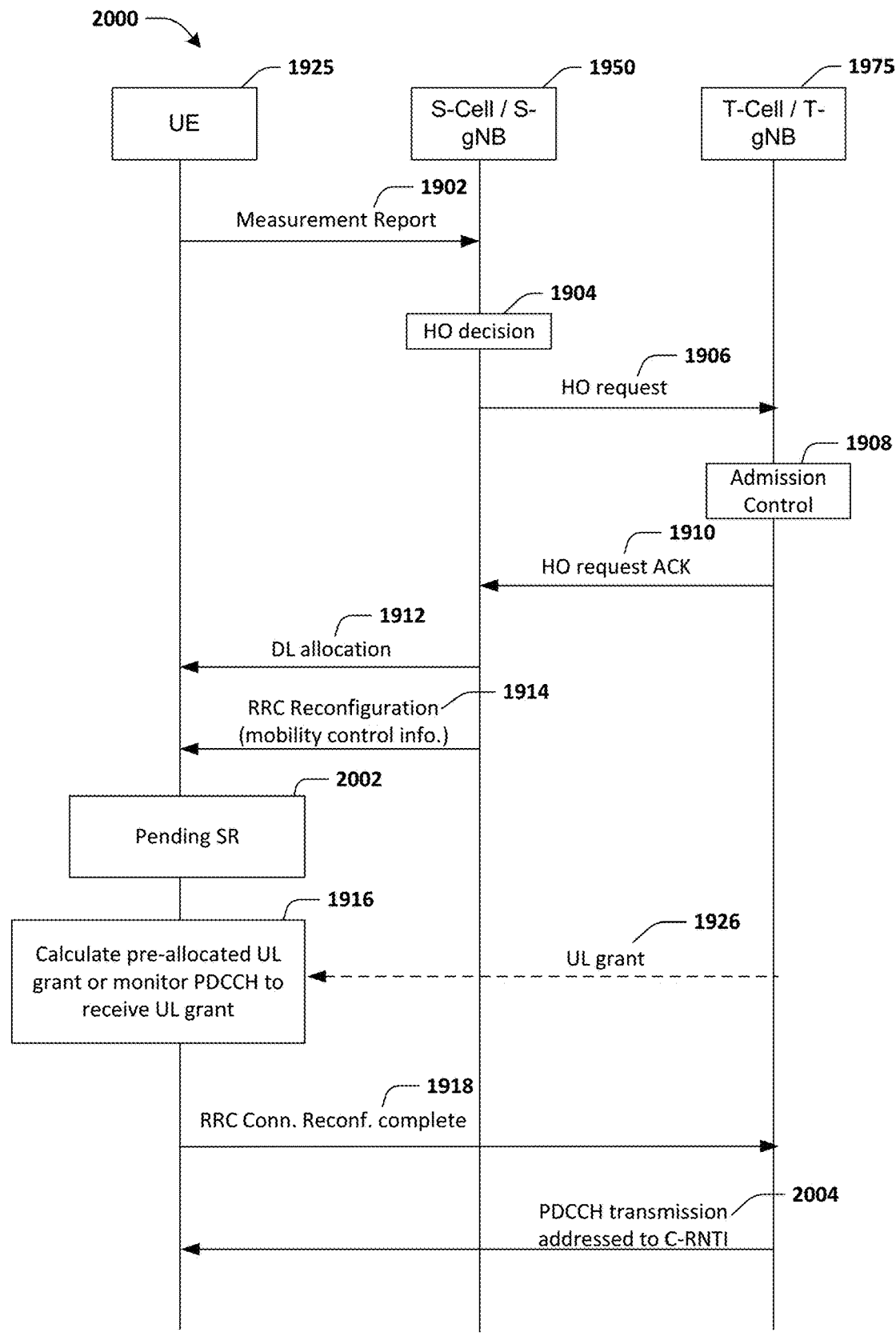
FIG. 20 illustrates examples of a system for performing an RACH-less handover procedure.

FIG. 20 illustrates examples of a system 2000 for performing the RACH-less HO procedure using the UE 1925, the S-Cell 1950 and/or the T-Cell 1975. In some examples, the UE 1925 may not initiate a random access procedure due to a pending scheduling request 2002. For example, the UE 1925 may access the T-Cell 1975 using the one or more pre-allocated UL grants (and/or the one or more second pre-allocated UL grants) in order to perform the (RACH-less) HO (if the one or more pre-allocated UL grants (and/or the one or more second pre-allocated UL grants) for accessing the T-Cell 1975 are comprised within the second RRC reconfiguration message 1914).

Alternatively and/or additionally, the UE may monitor the PDCCH of the T-Cell 1975 to receive (e.g., acquire) the one or more UL grants 1926 (if the one or more pre-allocated UL grants (and/or the one or more second pre-allocated UL grants) for accessing the T-Cell 1975 are not comprised within the second RRC reconfiguration message 1914).

The UE 1925 may transmit the RRC reconfiguration complete message 1918 (e.g., the HO complete message) via the one or more pre-allocated UL grants (and/or the one or more second pre-allocated UL grants) comprised within the second RRC reconfiguration message 1914 and/or via the one or more UL grants 1926 received via PDCCH monitoring.

In some examples, a PDCCH transmission 2004 may be transmitted by the T-Cell 1975 to the UE 1925. For example, the PDCCH transmission 2004 may be associated with the one or more HO complete operations 1920 and/or may be performed to verify a C-RNTI (e.g., the new C-RNTI, a C-RNTI different than the new C-RNTI, etc.) comprised within the RRC reconfiguration complete message 1918. In some examples, the HO procedure may be complete responsive to the PDCCH transmission 2004 being transmitted to the UE 1925.

It may be appreciated that the RACH-less HO procedure may result in high HO performance with 0 ms interruption, lower latency, higher efficiency and/or higher reliability than other HO procedures.

In NR, beamforming may be utilized to increase antenna gain. Accordingly, beam management may be necessary for a network and/or the UE 1925 to determine one or more beams available for UL data transmission and/or DL data transmission. As illustrated in FIG. 19, the UE 1925 may provide the measurement report 1902, comprising the one or more beam measurement results, to the S-Cell 1950. The S-Cell 1950 may make the HO decision 1904 based upon the measurement report 1902 (and/or the RRM information). In some examples, if the HO decision 1904 is a decision to perform an HO (e.g., if the S-Cell 1950 decides to perform an HO based upon the measurement report 1902 and/or the RRM information), the S-Cell 1950 may provide the measurement report 1902 to the T-Cell 1975 via the HO request message 1906. For example, the measurement report 1902 may be included in the HO request message 1906 transmitted by the S-Cell 1950 to the T-Cell 1975.

The T-Cell 1975 may allocate one or more UL grants on a PDCCH via one or more DL signals associated with one or more beams indicated by the one or more beam measurement results for the UE 1925. Alternatively and/or additionally, the T-Cell 1975 may pre-allocate one or more pre-allocated UL grants associated with one or more DL signals (e.g., SSB and/or CSI-RS) of the T-Cell 1975 based upon the one or more beam measurement results. The one or more DL signals may be associated with one or more beams. Alternatively and/or additionally, the T-Cell 1975 may provide the one or more pre-allocated UL grants (and/or an association between the one or more pre-allocated UL grants and one or more identifications (e.g., IDs) of the one or more DL signals) to the S-Cell 1950 (via the HO ACK 1910). Alternatively and/or additionally, the S-Cell 1950 may provide the one or more pre-allocated UL grants (and/or the association between the one or more pre-allocated UL grants and the one or more identifications (e.g., IDs) of the one or more DL signals) to the UE 1925 (via the DL allocation message 1912 and/or the second RRC reconfiguration message 1914.

In some examples, the one or more pre-allocated UL grants may be provided (to the UE via the second RRC reconfiguration message 1914). Alternatively and/or additionally, the one or more pre-allocated UL grants may not be provided (to the UE). In some examples, prior to receiving an indication to assign one or more beams for PDCCH monitoring in the T-Cell 1975 (e.g., an indication of TCI state for UE-specific PDCCH), the UE 1925 may monitor a PDCCH of the T-Cell 1975 (to receive one or more UL grants during the RACH-less HO procedure, before transmitting the RRC reconfiguration complete message 1918 (e.g., the HO complete message). Alternatively and/or additionally, the UE 1925 may monitor a PDCCH of the T-Cell 1975 after RACH-less HO is completed (e.g., after transmitting the RRC reconfiguration complete message 1918 (e.g., the HO complete message). Alternatively and/or additionally, the UE may monitor a PDCCH of the T-Cell 1975 on one or more specific beams associated with the one or more DL signals.

If the one or more pre-allocated UL grants are not provided to the UE 1925 (and/or the UE 1925 is not configured with the one or more pre-allocated UL grants), which beam (and/or which beams) the UE 1925 should use to monitor the PDCCH of the T-Cell 1975 for acquiring the one or more UL grants 1926 remains unclear in existing technology. Further, if the UE the one or more pre-allocated UL grants are provided to the UE 1925 (and/or the UE 1925 is configured with the one or more pre-allocated UL grants), which beam (and/or which beams) the UE 1925 should use to monitor the PDCCH of the T-Cell 1975 for confirming that the RACH-less HO procedure is completed and/or for receiving the PDCCH transmission 2004 remains unclear in existing technology.

In some examples, an initial PDCCH beam associated with the T-Cell 1975 may be determined by identifying a beam, from a candidate list of beams, indicated by the second RRC reconfiguration message 1914 (e.g., the HO command), for monitoring a PDCCH of the T-Cell 1975. For example, the second RRC reconfiguration message 1914 may be indicative of a TCI state corresponding to the beam for PDCCH monitoring.

Alternatively and/or additionally, a PDCCH of the T-Cell 1975 may be monitored using a PDCCH beam that was (previously) used for monitoring a PDCCH of the S-Cell 1950.

Alternatively and/or additionally, if the one or more pre-allocated UL grants are provided to the UE 1925 (via the second RRC reconfiguration message 1914), a PDCCH of the T-Cell 1975 may be monitored using a beam associated with the one or more pre-allocated UL grants.

In a first embodiment, a PDCCH may be monitored using one or more beams associated with a DL signal associated with a measurement report. A UE may transmit a measurement report to a network prior to performing an RACH-less HO procedure. A target cell may transmit a signal on a PDCCH to the UE based upon the measurement report. Alternatively and/or additionally, the UE may monitor the PDCCH of the target cell using a target beam (e.g., a best beam) associated with the measurement report (and/or the target cell may transmit the signal on the PDCCH to the UE using the target beam).

In some examples, the target beam may be selected from amongst one or more beams of the measurement report. Alternatively and/or additionally, the target beam may be associated with a highest quality of one or more qualities associated with the one or more beams. For example, the target beam may be associated with a quality that is higher than one or more other qualities of one or more other beams, different than the target beam, of the one or more beams. In some examples, the one or more qualities associated with the one or more beams may correspond to one or more RSRPs associated with the one or more beams. Alternatively and/or additionally, the target beam may be associated with a highest RSRP of one or more RSRPs associated with the one or more beams. For example, the target beam may be associated with an RSRP that is higher than one or more other RSRPs of one or more other beams, different than the target beam, of the one or more beams. In some examples, the one or more qualities (and/or the one or more RSRPs) may be determined (e.g., measured) after the UE synchronizes with (and/or to) the target cell.

In some examples, the measurement report may comprise a beam list. Alternatively and/or additionally, the beam list may be indicative of the one or more beams. Alternatively and/or additionally, an order of the beam list may be based upon the one or more qualities (and/or the one or more RSRPs). Alternatively and/or additionally, the target beam may be a first beam of the beam list (e.g., the target beam may be at the top of the beam list and/or the target beam may be in a first field of the beam list). Alternatively and/or additionally, the target beam may be a last beam of the beam list (e.g., the target beam may be at the bottom of the beam list and/or the target beam may be in a last field of the beam list).

In an example in association with the system 1900 illustrated by FIG. 19, when (e.g., prior to, after and/or during) the UE 1925 transmits the measurement report 1902 (associated with the HO decision 1904) to the S-Cell 1950, the UE 1925 may monitor a PDCCH on the target beam in the measurement report 1902.

In an example in association with the system 1900 illustrated by FIG. 19, when (e.g., prior to, after and/or during) the UE 1925 receives the second RRC reconfiguration message 1914 (from the S-Cell 1950), the UE 1925 may monitor a PDCCH on the target beam in the measurement report 1902.

In an example in association with the system 1900 illustrated by FIG. 19, the UE 1925 may monitor a PDCCH on the target beam in the measurement report 1902 to receive the one or more UL grants 1926 and/or the UE 1925 may transmit the RRC reconfiguration complete message 1918 (e.g., the HO complete message) based upon the one or more UL grants 1926 (e.g., the one or more operations 1916 may comprise monitoring a PDCCH on the target beam in the measurement report 1902 to receive the one or more UL grants 1926).

In another example, the UE may monitor a PDCCH on the target beam in the measurement report after synchronizing with (and/or to) the target cell.

In another example, the UE may be provided with one or more pre-allocated UL grants (via an RRC reconfiguration message (such as the second RRC reconfiguration message 1914 in FIG. 19) and/or the UE may monitor a PDCCH on the target beam in the measurement report (after being provided with the one or more pre-allocated UL grants and/or after being configured with the one or more pre-allocated UL grants).

Alternatively and/or additionally, the UE may monitor a PDCCH on each beam of the one or more beams (of the beam list) included in the measurement report. In some examples, the UE may perform beam sweeping to monitor one or more PDCCHs on the one or more beams included in the measurement report.

In an example in association with the system 1900 illustrated by FIG. 19, when (e.g., prior to, during and/or after) the UE 1925 transmits the measurement report 1902 (to the S-Cell 1950), the UE 1925 may monitor a PDCCH on each beam included in the measurement report 1902 (e.g., by performing beam sweeping).

In an example in association with the system 1900 illustrated by FIG. 19, when (e.g., prior to, during and/or after) the UE 1925 receives the second RRC reconfiguration message 1914 (from the S-Cell 1950), the UE 1925 may monitor a PDCCH on each beam included in the measurement report 1902 (e.g., by performing beam sweeping).

In an example in association with the system 1900 illustrated by FIG. 19, the UE 1925 may monitor a PDCCH on each beam included in the measurement report 1902 (e.g., by performing beam sweeping) to receive the one or more UL grants 1926 and/or the UE 1925 may transmit the RRC reconfiguration complete message 1918 (e.g., the HO complete message) based upon the one or more UL grants 1926 (e.g., the one or more operations 1916 may comprise monitoring a PDCCH on each beam included in the measurement report 1902 to receive the one or more UL grants 1926).

In another example, the UE may monitor a PDCCH on each beam included in the measurement report (e.g., by performing beam sweeping) after synchronizing with (and/or to) the target cell.

In another example, the UE may be provided with one or more pre-allocated UL grants (via an RRC reconfiguration message, such as the second RRC reconfiguration message 1914 in FIG. 19) and/or the UE may monitor a PDCCH on each beam included in the measurement report (e.g., by performing beam sweeping) (after being provided with the one or more pre-allocated UL grants and/or after being configured with the one or more pre-allocated UL grants).

Alternatively and/or additionally, the UE may monitor a PDCCH on a qualified beam of the one or more beams (of the beam list) included in the measurement report. For example, the qualified beam may be associated with a quality that is greater than a threshold quality. Alternatively and/or additionally, the qualified beam may be associated with an RSRP that is greater than a threshold RSRP. In some examples, the UE may perform beam sweeping to monitor a PDCCH on the qualified beam included in the measurement report.

In an example in association with the system 1900 illustrated by FIG. 19, when (e.g., prior to, during and/or after) the UE 1925 transmits the measurement report 1902 (to the S-Cell 1950), the UE 1925 may monitor a PDCCH on the qualified beam included in the measurement report 1902.

In an example in association with the system 1900 illustrated by FIG. 19, when (e.g., prior to, during and/or after) the UE 1925 receives the second RRC reconfiguration message 1914 (from the S-Cell 1950), the UE 1925 may monitor a PDCCH on the qualified beam included in the measurement report 1902.

In an example in association with the system 1900 illustrated by FIG. 19, the UE 1925 may monitor a PDCCH on the qualified beam included in the measurement report 1902 to receive the one or more UL grants 1926 and/or the UE may transmit the RRC reconfiguration complete message 1918 (e.g., the HO complete message) based upon the one or more UL grants 1926 (e.g., the one or more operations 1916 may comprise monitoring a PDCCH on the qualified beam included in the measurement report 1902 to receive the one or more UL grants 1926).

In another example, the UE may monitor a PDCCH on the qualified beam included in the measurement report after synchronizing with (and/or to) the target cell.

In another example, the UE may be provided with one or more pre-allocated UL grants (via an RRC reconfiguration message, such as the second RRC reconfiguration message 1914 in FIG. 19) and/or the UE may monitor a PDCCH on the qualified beam included in the measurement report (after being provided with the one or more pre-allocated UL grants and/or after being configured with the one or more pre-allocated UL grants).

In a second embodiment, a PDCCH may be monitored using one or more beams associated with a DL signal (of a target cell) configured in an RRC reconfiguration message. A UE may transmit a measurement report to a network prior to performing an RACH-less HO procedure. The target cell may determine one or more beams to be used by the UE for PDCCH monitoring (based upon the measurement report). Alternatively and/or additionally, the target cell may indicate (to the UE) (e.g., via a TCI state, indicated by a TCI State ID field (e.g., TCI-StateID)) the one or more beams to be used by the UE for PDCCH monitoring. The target cell may include beam information (e.g., one or more beam identifiers, one or more DL signal identifiers, one or more SSB identifiers, one or more CSI-RS identifiers, a TCI state indication (for PDCCH reception for a CORESET of the target cell), a candidate list of beams (e.g., a list of TCI-StateID fields, such as tci-StatesPDCCH, etc.)) in an RRC reconfiguration message.

In some examples, the UE may receive the RRC reconfiguration message comprising the beam information. For example, the target cell may transmit the RRC reconfiguration message to the UE. Alternatively and/or additionally, the target cell may transmit the RRC reconfiguration message to a source cell (within an HO ACK message) and/or the source cell may transmit the RRC reconfiguration message to the UE. The UE may determine the one or more beams to be used for PDCCH monitoring based upon the beam information within the RRC reconfiguration message.

In an example, the UE may monitor the PDCCH of the target cell using a target beam associated with the RRC reconfiguration message. For example, the target beam may be determined based upon the beam information of the RRC reconfiguration message. Alternatively and/or additionally, the target beam may be selected from amongst one or more beams of the beam information of the RRC reconfiguration message. For example, the one or more beams of the beam information may be included in the candidate list of beams of the beam information (e.g., the candidate list of beams may comprise indications of the one or more beams).

Alternatively and/or additionally, the target beam may be associated with a highest quality of one or more qualities associated with the one or more beams (included in the candidate list of beams) of the beam information. For example, the target beam may be associated with a quality that is higher than one or more other qualities of one or more other beams, different than the target beam, of the one or more beams (included in the candidate list of beams) of the beam information.

In some examples, the one or more qualities associated with the one or more beams may correspond to one or more RSRPs associated with the one or more beams. Alternatively and/or additionally, the target beam may be associated with a highest RSRP of one or more RSRPs associated with the one or more beams (included in the candidate list of beams) of the beam information. For example, the target beam may be associated with an RSRP that is higher than one or more other RSRPs of one or more other beams, different than the target beam, of the one or more beams (included in the candidate list of beams) of the beam information.

Alternatively and/or additionally, the target beam may be in a first (e.g., initial) field of the beam information (and/or the candidate list of beams). Alternatively and/or additionally, the target beam may be a last field of the beam information (and/or the candidate list of beams).

In another example, responsive to receiving the RRC reconfiguration message comprising the beam information, the UE may select a qualified beam based upon the beam information for PDCCH monitoring (and/or the UE may monitor a PDCCH on the qualified beam).

In another example, when (e.g., prior to, after and/or during) the UE receives the RRC reconfiguration message comprising the beam information, the UE may monitor a PDCCH on each beam of the one or more beams (included in the candidate list of beams) of the beam information (e.g., by performing beam sweeping).

In an example in association with the system 1900 illustrated by FIG. 19, when (e.g., prior to, during and/or after) the UE 1925 receives the second RRC reconfiguration message 1914 (from the S-Cell 1950), the UE 1925 may monitor a PDCCH on each beam indicated by beam information in the second RRC reconfiguration message 1914 (e.g., by performing beam sweeping).

In an example in association with the system 1900 illustrated by FIG. 19, the UE 1925 may monitor a PDCCH on each beam indicated by beam information in the second RRC reconfiguration message 1914 (e.g., by performing beam sweeping) to receive the one or more UL grants 1926 and/or the UE 1925 may transmit the RRC reconfiguration complete message 1918 (e.g., the HO complete message) based upon the one or more UL grants 1926 (e.g., the one or more operations 1916 may comprise monitoring a PDCCH on each beam indicated by the beam information in the second RRC reconfiguration message 1914 to receive the one or more UL grants 1926).

In another example, the UE may monitor a PDCCH on each beam indicated by beam information in the RRC reconfiguration message (e.g., by performing beam sweeping) after synchronizing with (and/or to) the target cell.

In another example, the UE may be provided with one or more pre-allocated UL grants and/or the UE may monitor a PDCCH on each beam indicated by beam information in the RRC reconfiguration message (e.g., by performing beam sweeping) (after being provided with the one or more pre-allocated UL grants and/or after being configured with the one or more pre-allocated UL grants).

In some examples, the RRC reconfiguration message may comprise a candidate list of beams for PDCCH monitoring indicative of one or more candidate beams. Alternatively and/or additionally, the RRC reconfiguration message may be indicative of one or more second beams, of the one or more candidate beams (of the candidate list of beams for PDCCH monitoring) that should be used for PDCCH monitoring (in the target cell).

Alternatively and/or additionally, the beam information may be included in an HO ACK message.

In a third embodiment, a PDCCH may be monitored using one or more beams associated with a qualified DL signal (of a target cell) (e.g. the PDCCH may be monitored using the one or more beams after the UE synchronizes to and/or with the target cell). RACH-less HO may be configured. A UE may perform synchronization with (and/or to) a target cell after receiving an RRC reconfiguration message (from the target cell and/or from a source cell). Responsive to (and/or after) performing synchronization with (and/or to) the target cell, the UE may estimate and/or measure one or more DL signals of the target cell. The UE may (then) monitor one or more PDCCHs on one or more beams associated with one or more qualified DL signals (of the target cell) which may be estimated and/or measured after performing synchronization with (and/or to) the target cell.

In some examples, when (e.g., prior to, during and/or after) the UE receives the RRC reconfiguration message, the UE may perform synchronization with (and/or to) the target cell. The UE may (then) estimate and/or measure one or more beams associated with one or more DL signals of the target cell to determine a target beam for monitoring a PDCCH. For example, the target beam may be associated with a highest quality of one or more qualities associated with the one or more beams. For example, the target beam may be associated with a quality that is higher than one or more other qualities of one or more other beams, different than the target beam, of the one or more beams. In some examples, the one or more qualities associated with the one or more beams may correspond to one or more RSRPs associated with the one or more beams. Alternatively and/or additionally, the target beam may be associated with a highest RSRP of one or more RSRPs associated with the one or more beams. For example, the target beam may be associated with an RSRP that is higher than one or more other RSRPs of one or more other beams, different than the target beam, of the one or more beams.

In another example, when (e.g., prior to, during and/or after) the UE receives the RRC reconfiguration message, the UE may perform synchronization with (and/or to) the target cell. The UE may (then) estimate and/or measure the one or more beams to select a qualified beam for monitoring a PDCCH. The qualified beam may be associated with a quality that is greater than a threshold quality. Alternatively and/or additionally, the qualified beam may be associated with an RSRP that is greater than a threshold RSRP.

In some examples, the one or more beams (for the UE to estimate and/or measure) may be configured in the RRC reconfiguration message (e.g., the RRC reconfiguration message may be indicative of the one or more beams).

Alternatively and/or additionally, the one or more beams (for the UE to estimate and/or measure) may be included in a measurement report (e.g., the measurement report may be indicative of the one or more beams).

Alternatively and/or additionally, the one or more beams (for the UE to estimate and/or measure) may be configured by the source cell (e.g., the one or more beams may be configured before receiving the RRC reconfiguration message).

Alternatively and/or additionally, the RRC reconfiguration message may comprise a candidate list of beams for PDCCH monitoring indicative of one or more candidate beams. Alternatively and/or additionally, the RRC reconfiguration message may be indicative of one or more second beams, of the one or more candidate beams (of the candidate list of beams for PDCCH monitoring) that should be used for PDCCH monitoring (in the target cell).

Alternatively and/or additionally, when (e.g., prior to, during and/or after) the UE performs synchronization with (and/or to) the target cell, the UE may trigger and/or generate the measurement report.

In a fourth embodiment, a UE may monitor a PDCCH using one or more beams associated with a DL signal (of a source cell) (e.g., the beam may be configured for PDCCH monitoring in the source cell). In some examples, the source cell may transmit information to a target cell. The information may be transmitted to the target cell in association with transmission of an HO request message to the target cell (e.g., the HO request message may comprise the information and/or the information may be transmitted separately from the HO request message to the target cell). The information may be indicative of one or more beams, used by the UE for PDCCH monitoring of the source cell, associated with a DL signal of the source cell. Alternatively and/or additionally, the target cell may transmit a signal on a PDCCH of the one or more beams, indicated by the source cell (via the information and/or the HO request message).

Alternatively and/or additionally, the information may be indicative of one or more beams that the UE is configured to use for PDCCH monitoring of the source cell. The target cell may be aware that the UE may monitor a PDCCH on the one or more beams if an RACH-less HO procedure is not completed. The target cell may transmit a signal on a PDCCH of the one or more beams that the UE is configured to use for PDCCH monitoring of the source cell.

The UE may monitor a PDCCH on one or more beams of the target cell, associated with the DL signal of the source cell, configured for PDCCH monitoring in the source cell (e.g., that the UE is configured to use for PDCCH monitoring in the source cell).

In an example in association with the system 1900 illustrated by FIG. 19, when (e.g., prior to, after and/or during) the UE 1925 transmits the measurement report 1902 to the S-Cell 1950, the UE 1925 may monitor one or more PDCCHs on the one or more beams associated with a DL signal of the S-Cell 1950 configured for PDCCH monitoring.

In an example in association with the system 1900 illustrated by FIG. 19, when (e.g., prior to, after and/or during) the UE 1925 receives the second RRC reconfiguration message 1914 (from the S-Cell 1950), the UE 1925 may monitor one or more PDCCHs on the one or more beams associated with the DL signal of the S-Cell 1950 configured for PDCCH monitoring.

In an example in association with the system 1900 illustrated by FIG. 19, the UE 1925 may monitor one or more PDCCHs on the one or more beams associated with the DL signal of the S-Cell 1950 configured for PDCCH monitoring to receive the one or more UL grants 1926 and/or the UE 1925 may transmit the RRC reconfiguration complete message 1918 (e.g., the HO complete message) based upon the one or more UL grants 1926 (e.g., the one or more operations 1916 may comprise monitoring one or more PDCCHs on the one or more beams associated with the DL signal of the S-Cell 1950 configured for PDCCH monitoring to receive the one or more UL grants 1926).

In another example, one or more latest TCI states for PDCCH reception configured for the source cell (e.g., based upon one or more indications of the one or more latest TCI states for UE-specific PDCCH) may be used as (and/or may be used to determine) one or more TCI states for PDCCH reception for the target cell.

In another example, one or more latest beams for PDCCH reception configured for the source cell (e.g., based upon one or more indications of one or more latest TCI states for UE-specific PDCCH) may be used as (and/or may be used to determine) the one or more beams for PDCCH reception for the target cell.

In another example, the UE may monitor one or more PDCCHs on the one or more beams associated with the DL signal of the source cell that the UE is configured to use for PDCCH monitoring of the source cell after synchronizing with (and/or to) the target cell.

In another example, the UE may be provided with one or more pre-allocated UL grants (via an RRC reconfiguration message (such as the second RRC reconfiguration message 1914 in FIG. 19) and/or the UE may monitor one or more PDCCHs on the one or more beams associated with the DL signal of the source cell that the UE is configured to use for PDCCH monitoring of the source cell (after being provided with the one or more pre-allocated UL grants and/or after being configured with the one or more pre-allocated UL grants).

Alternatively and/or additionally, the one or more beams associated with the DL signal of the source cell may be associated with a DL signal of the target cell.

In a fifth embodiment, a PDCCH may be monitored using one or more beams associated with a DL signal (of a target cell) which is associated with one or more pre-allocated UL grants. In an RACH-less HO procedure, the target cell may provide the one or more UL grants to a UE and/or configure the UE with the one or more pre-allocated UL grants for transmission of an RRC reconfiguration complete message. For example, the target cell may allocate the one or more pre-allocated UL grants associated with a DL signal (of the target cell) via an HO ACK message transmitted to a source cell. The source cell may transmit the one or more pre-allocated UL grants associated with the DL signal (of the target cell) to the UE (e.g., the one or more pre-allocated UL grants may be comprised within an RRC reconfiguration message transmitted by the source cell to the UE.

In some examples, when the UE receives the RRC reconfiguration message (from the source cell), the UE may monitor one or more PDCCH on one or more beams associated with the DL signal (of the target cell) which is associated with the one or more pre-allocated UL grants. An association (e.g., a relationship) between the DL signal (of the target cell) for PDCCH monitoring and the one or more pre-allocated UL grants may be indicated by the RRC reconfiguration message.

Alternatively and/or additionally, if the one or more pre-allocated UL grants are associated with multiple DL signals, a target DL signal (e.g., a best DL signal) may be selected by the UE from the multiple DL signals for PDCCH monitoring. Alternatively and/or additionally, the target DL signal may be associated with a highest quality of multiple qualities associated with the multiple DL signals. In some examples, the target DL signal may be associated with a quality that is higher than one or more other qualities of the multiple qualities. In some examples, the multiple qualities associated with the multiple DL signals may correspond to multiple RSRPs associated with the multiple DL signals. Alternatively and/or additionally, the target DL signal may be associated with a highest RSRP of the multiple RSRPs.

Alternatively and/or additionally, the UE may select a beam (associated with the DL signal of the target cell), which may be used for transmission of the RRC reconfiguration complete message, to monitor a PDCCH (of the target cell).

For example, the UE may transmit the RRC reconfiguration complete message (to the target cell) on a first beam (via a pre-allocated UL grant) and/or the UE may monitor a PDCCH on the first beam.

In an example in association with the system 1900 illustrated by FIG. 19, when (e.g., prior to, during and/or after) the UE 1925 receives the second RRC reconfiguration message 1914 (from the S-Cell 1950), the UE 1925 may receive one or more pre-allocated UL grants (via the second RRC reconfiguration message 1914) associated with a second beam and/or the UE 1925 may monitor a PDCCH on the second beam.

Alternatively and/or additionally, if the one or more pre-allocated UL grants are associated with multiple beams, the UE may monitor a PDCCH on a qualified beam associated with the one or more pre-allocated UL grants. For example, the UE may select a qualified beam associated with the one or more pre-allocated UL grants to monitor a PDCCH. In some examples, qualified beam may be associated with a quality that is greater than a threshold quality. Alternatively and/or additionally, the qualified beam may be associated with an RSRP that is greater than a threshold RSRP.

Alternatively and/or additionally, if the one or more pre-allocated UL grants are associated with multiple beams, the UE may monitor a PDCCH on each beam associated with the one or more pre-allocated UL grants. For example, the UE may perform beam sweeping to monitor a PDCCH on each beam associated with the one or more pre-allocated UL grants.

In some examples, each of the first embodiment, the second embodiment, the third embodiment, the fourth embodiment and the fifth embodiment, may be implemented independently and/or separately. Alternatively and/or additionally, a combination of one or more of the first embodiment, the second embodiment, the third embodiment, the fourth embodiment and/or the fifth embodiment may be implemented.

In some examples, after completion of an RACH-less HO procedure, a UE may monitor a PDCCH on one or more beams in a target cell, where the one or more beams may be the same as one or more beams that are used for monitoring a PDCCH in the target cell during the RACH-less HO procedure. For example, the UE may monitor a PDCCH on a first beam to receive one or more UL grants for transmitting an RRC reconfiguration message, and/or the UE may monitor a PDCCH on the first beam after transmitting the RRC reconfiguration message.

Alternatively and/or additionally, the UE may transmit a new measurement report (e.g., the new measurement report may comprise latest (e.g., most recent) beam measurement results) to the target cell via the RRC reconfiguration message (e.g., the RRC reconfiguration message may comprise the new measurement report). The UE may (then) monitor a PDCCH on one or more beams based upon the new measurement report (e.g., the one or more beams may be selected for PDCCH monitoring based upon the new measurement report and/or the latest beam measurement results).

For example, the UE may monitor a PDCCH on a target beam based upon the new measurement report (e.g., the target beam may be selected for PDCCH monitoring based upon the new measurement report and/or the latest beam measurement results). For example, the target beam may have a highest quality of one or more qualities of one or more beams in the new measurement report. Alternatively and/or additionally, the target beam may have a highest RSRP of one or more RSRPs of one or more beams in the new measurement report.

In another example, the UE may monitor a PDCCH on a qualified beam based upon the new measurement report (e.g., the qualified beam may be selected for PDCCH monitoring based upon the new measurement report and/or the latest beam measurement results). For example, the qualified beam may be associated with a quality that is greater than a threshold quality. Alternatively and/or additionally, the qualified beam may be associated with an RSRP that is greater than a threshold RSRP.

In another example, the UE may monitor a PDCCH on each beam included in the new measurement report (e.g., by performing beam sweeping).

Alternatively and/or additionally, the UE may initiate a beam failure recovery (BFR) procedure and/or a random access procedure in the target cell when the RACH-less HO procedure is completed (e.g., after transmitting an RRC reconfiguration complete message). In some examples, the random access procedure may be a contention-free random access procedure (e.g., one or more RACH resources may be configured in an RRC reconfiguration message). Alternatively and/or additionally, the random access procedure may be a contention-based random access procedure.

It may be appreciated that one or more of the techniques provided herein for the UE to determine one or more beams to use for monitoring a PDCCH on the target cell may be used during the RACH-less HO procedure and/or after the RACH-less HO procedure is completed (e.g., for the UE to monitor an initial PDCCH on the target cell after the RACH-less HO procedure is completed). Alternatively and/or additionally, one or more of the techniques provided herein for the UE to determine one or more beams to use for monitoring a PDCCH on the target cell may be used when the UE adds a new SCell. Alternatively and/or additionally, the new SCell may be configured for the UE to monitor a PDCCH (e.g., the UE may monitor a PDCCH on the new SCell). Alternatively and/or additionally, the new SCell may be activated for the UE to monitor the PDCCH. Alternatively and/or additionally, the new SCell may not be cross-scheduled by one or more other SCells.

Alternatively and/or additionally, one or more of the techniques provided herein for the UE to determine one or more beams to use for monitoring a PDCCH on the target cell may be used for performing an intra-cell HO procedure.

Alternatively and/or additionally, when the UE adds a new SCell and/or receives an RRC reconfiguration message, the UE may determine one or more beams to monitor a PDCCH on the new SCell based upon beam information (e.g., the beam information may be included in the RRC reconfiguration message).

Alternatively and/or additionally, a beam (as used herein) may refer to and/or may be associated with SSB resources and/or CSI-RS resources. Alternatively and/or additionally, a beam (as used herein) may refer to and/or may be a DL beam and/or a UL beam. Alternatively and/or additionally, a beam (as used herein) may refer to and/or may be a TX beam and/or an RX beam. Alternatively and/or additionally, a beam (as used herein) may be refer to and/or may be a network beam (e.g., NW beam) and/or a UE beam.

Alternatively and/or additionally, a source cell (as used herein) may be replaced with a source gNB. For example, one or more techniques presented herein that are described as applying to a source cell may (also) be applied to a source gNB.

Alternatively and/or additionally, a target cell (as used herein) may be replaced with a target gNB. For example, one or more techniques presented herein that are described as applying to a target cell may (also) be applied to a target gNB.

Alternatively and/or additionally, a source cell (as used herein) may be replaced with a source eNB. For example, one or more techniques presented herein that are described as applying to a source cell may (also) be applied to a source eNB.

Alternatively and/or additionally, a target cell (as used herein) may be replaced with a target eNB. For example, one or more techniques presented herein that are described as applying to a target cell may (also) be applied to a target eNB.

Alternatively and/or additionally, a qualified beam may be a beam where a quality of the beam (e.g., SS-RSRP and/or CSI-RSRP) is above a quality threshold (e.g., rsrp-ThresholdSSB and/or csirs-Threshold). Alternatively and/or additionally, the qualified beam may be selected using a MAC layer and/or a PHY layer.

Alternatively and/or additionally, a qualified DL signal may be a DL signal where a quality of the DL signal (e.g., SS-RSRP and/or CSI-RSRP) is above a quality threshold (e.g., rsrp-ThresholdSSB and/or csirs-Threshold). Alternatively and/or additionally, the qualified DL signal may be selected using a MAC layer and/or a PHY layer.

Figure 21:
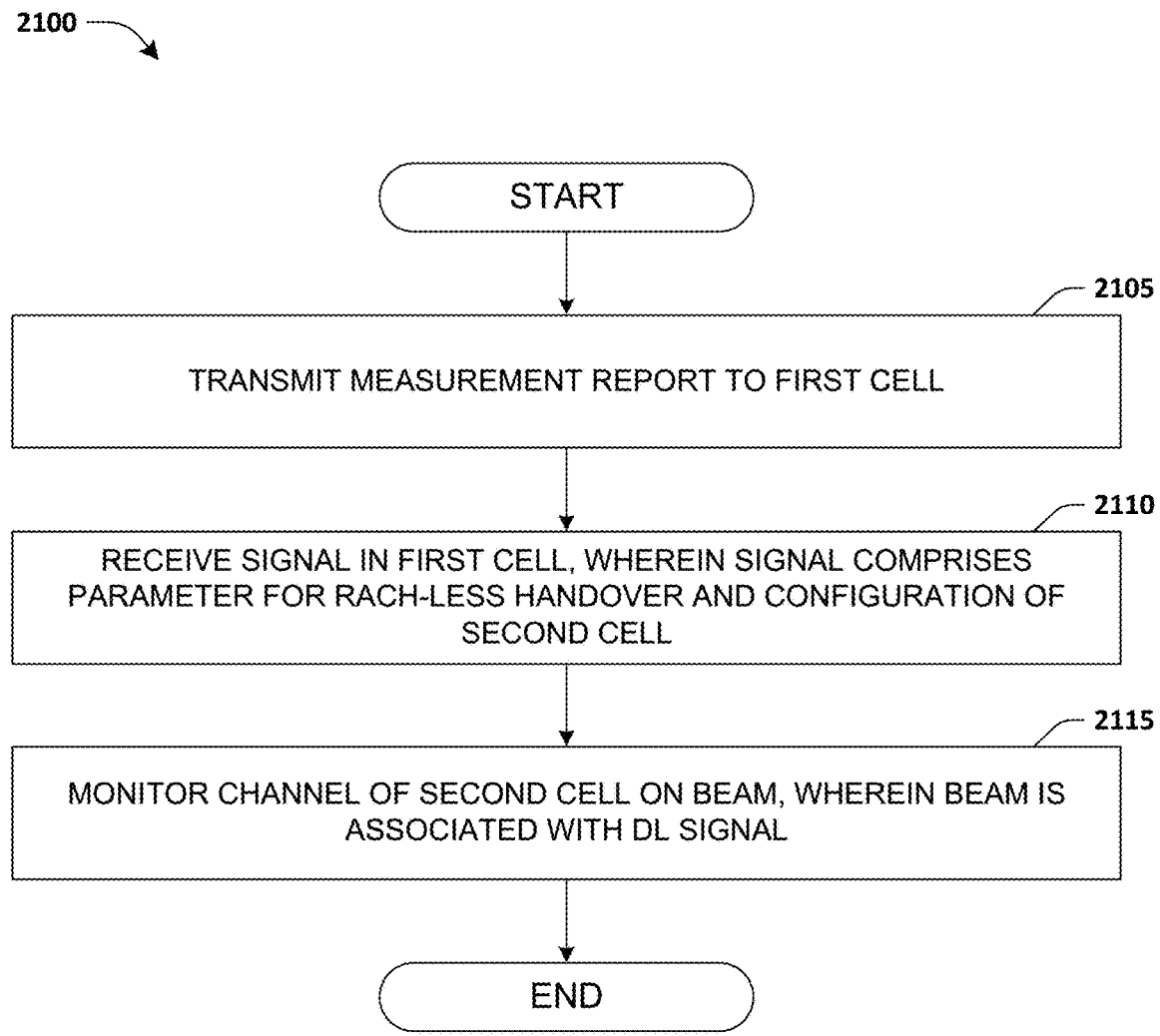
FIG. 21 is a flow chart according to one exemplary embodiment.

FIG. 21 is a flow chart 2100 according to one exemplary embodiment from the perspective of a UE. In step 2105, a measurement report may be transmitted to a first cell (by the UE). In step 2110, a signal may be received in the first cell, wherein the signal comprises a parameter for RACH-less handover and/or a configuration of a second cell. In step 2115, a channel of the second cell on a beam may be monitored, wherein the beam is associated with a DL signal.

In the context of the embodiment illustrated in FIG. 21 and discussed above, the beam may be a target beam included in the measurement report. In some examples, the target beam may be associated with a highest quality of one or more qualities, of a beam measurement result in the measurement report, associated with one or more beams of the measurement report.

Alternatively and/or additionally, the target beam may be associated with a first field of a beam measurement result (e.g., a beam list) in the measurement report (e.g., the target beam may be in the first field of the beam measurement result and/or the first field of the beam measurement result may be indicative of the target beam).

Alternatively and/or additionally, the target beam may be associated with a last field of a beam measurement result (e.g., a beam list) in the measurement report (e.g., the target beam may be in the last field of the beam measurement result and/or the last field of the beam measurement result may be indicative of the target beam).

Alternatively and/or additionally, the beam may be a qualified beam included in the measurement report. In some examples, the qualified beam may be associated with a quality that is greater than a threshold quality.

Alternatively and/or additionally, the beam may correspond to (and/or may be) multiple beams included in the measurement report. Alternatively and/or additionally, the multiple beams may comprise each (and/or every) beam included in the measurement report (e.g., the channel of the second cell may be monitored on the multiple beams, which may be performed by performing beam sweeping).

Figure 22:
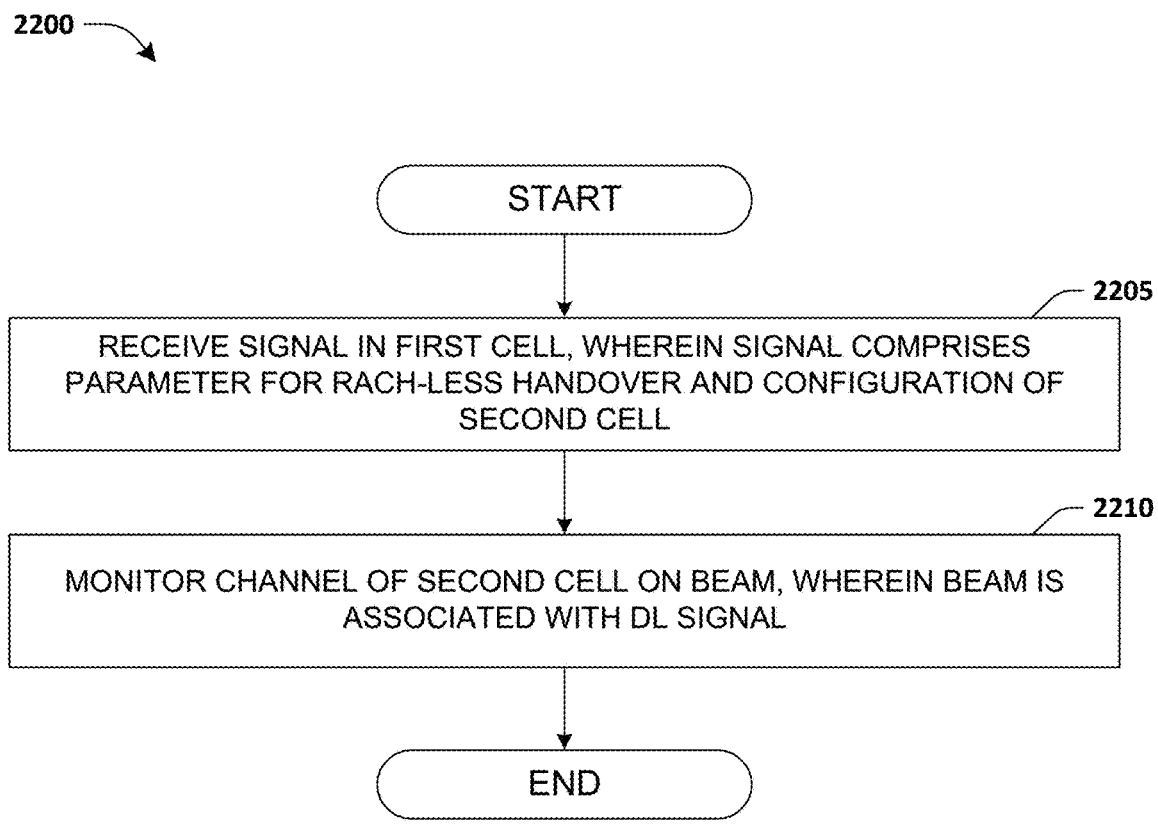
FIG. 22 is a flow chart according to one exemplary embodiment.

FIG. 22 is a flow chart 2200 according to one exemplary embodiment from the perspective of a UE. In step 2205, a signal may be received in a first cell, wherein the signal comprises a parameter for RACH-less handover and/or a configuration of a second cell. In step 2210, a channel of the second cell on a beam may be monitored, wherein the beam is associated with a DL signal.

In the context of the embodiment illustrated in FIG. 22 and discussed above, the beam may be configured (and/or included and/or indicated) in the signal.

Alternatively and/or additionally, the beam may be a target beam of a list configured (and/or included and/or indicated) in the signal. In some examples, the target beam may be associated with a highest quality of one or more qualities associated with one or more beams configured (and/or included and/or indicated) in the signal. Alternatively and/or additionally, the target beam may be associated with a first field of the list, wherein the list is a candidate list of the beam (e.g., a candidate list of beams). Alternatively and/or additionally, the target beam may be associated with a last field of the list, wherein the list is the candidate list of the beam (e.g., the candidate list of beams).

Alternatively and/or additionally, the beam may be a qualified beam included in the signal. In some examples, the qualified beam may be associated with a quality that is greater than a threshold quality.

Alternatively and/or additionally, the beam may correspond to multiple beams included in the signal. Alternatively and/or additionally, the multiple beams may comprise each (and/or every) beam included in the signal (e.g., the channel of the second cell may be monitored on the multiple beams, which may be performed by performing beam sweeping).

Figure 23:
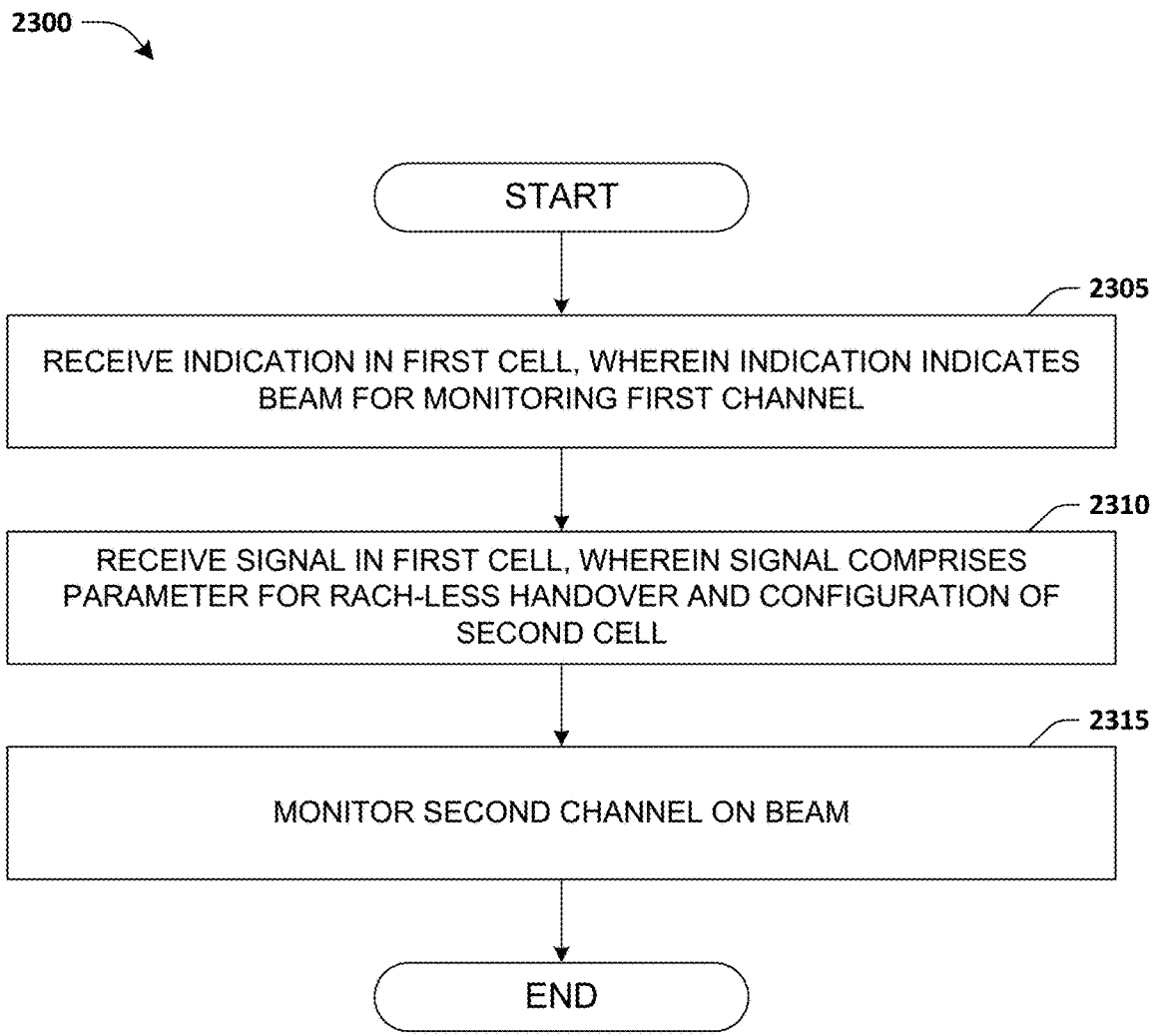
FIG. 23 is a flow chart according to one exemplary embodiment.

FIG. 23 is a flow chart 2300 according to one exemplary embodiment from the perspective of a UE. In step 2305, an indication may be received in a first cell, wherein the indication indicates a beam for monitoring a first channel (e.g., the indication may be indicative of the beam for monitoring the first channel). In step 2310, a signal may be received in the first cell, wherein the signal comprises a parameter for RACH-less handover and/or a configuration of a second cell. In step 2315, a second channel on the beam may be monitored.

In the context of the embodiment illustrated in FIG. 23 and discussed above, the beam may be associated with a DL signal of the first cell. Alternatively and/or additionally, the first channel may be a first PDCCH of the first cell. Alternatively and/or additionally, the second channel may be a second PDCCH of the second cell. In some examples, the first PDCCH may be different than the second PDCCH. Alternatively and/or additionally, the first PDCCH may be the same as the second PDCCH. Alternatively and/or additionally, the indication may be a TCI state (and/or the indication may be indicative of the TCI state).

Figure 24:
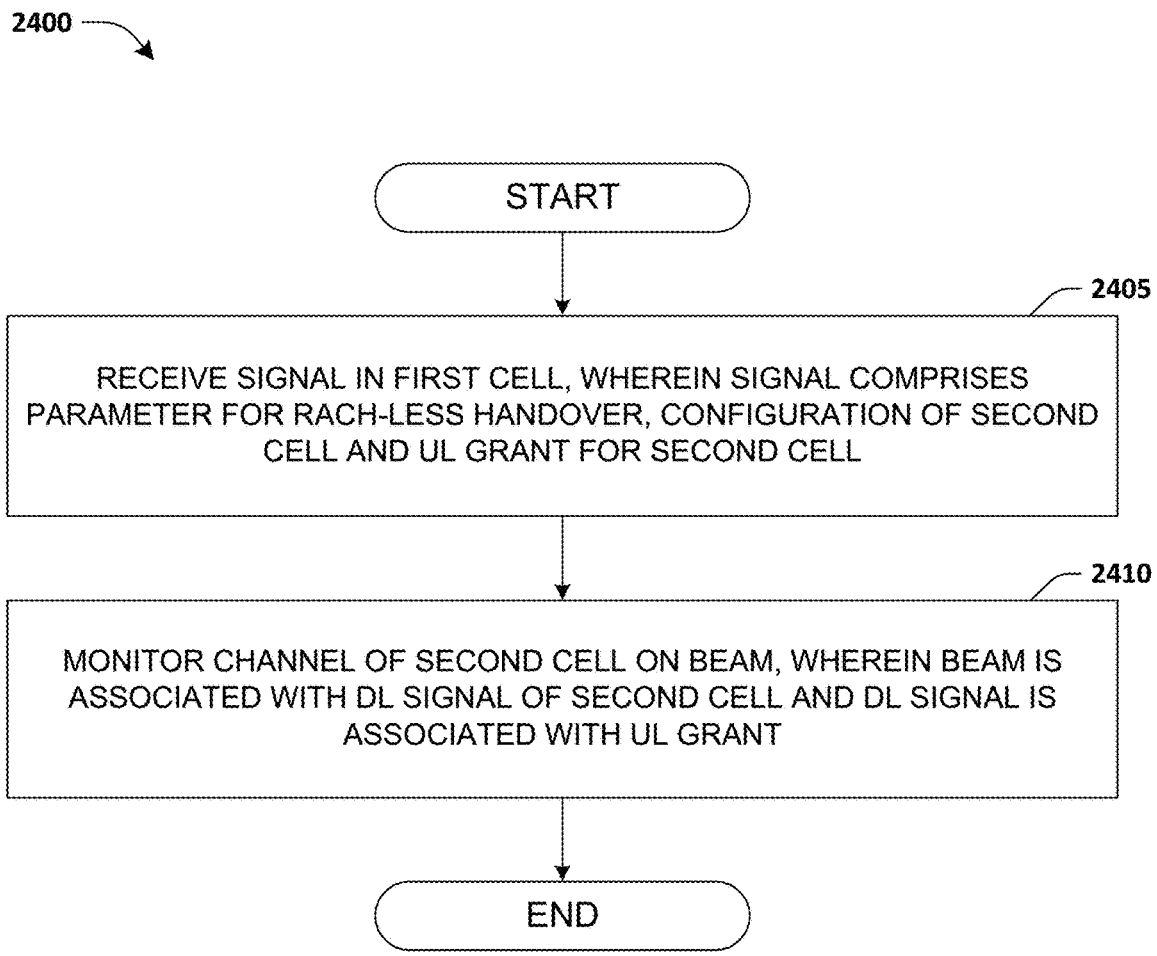
FIG. 24 is a flow chart according to one exemplary embodiment.

FIG. 24 is a flow chart 2400 according to one exemplary embodiment from the perspective of a UE. In step 2405, a signal may be received in a first cell, wherein the signal comprises a parameter for RACH-less handover, a configuration of a second cell and/or a UL grant for the second cell. In step 2410, a channel of the second cell on a beam may be monitored, wherein the beam is associated with a DL signal of the second cell and/or the DL signal is associated with the UL grant.

In the context of the embodiment illustrated in FIG. 24 and discussed above, the beam may be configured (and/or included and/or indicated) in the signal.

Alternatively and/or additionally, the beam may be a target beam if a number of beams (associated with the signal) is greater than one. In some examples, the target beam may be associated with a highest quality of one or more qualities associated with one or more beams (associated with the signal).

Alternatively and/or additionally, an association (e.g., a relationship) between the DL signal and the UL grant may be indicated by the signal.

Alternatively and/or additionally, the beam may be used for monitoring the channel of the second cell and for receiving the signal in the first cell.

In the context of the embodiment illustrated in FIG. 21, the embodiment illustrated in FIG. 22, the embodiment illustrated in FIG. 23 and/or the embodiment illustrated in FIG. 24, the UE may synchronize with (and/or to) the second cell.

In the context of the embodiment illustrated in FIG. 21, the embodiment illustrated in FIG. 22, the embodiment illustrated in FIG. 23 and/or the embodiment illustrated in FIG. 24, the UE may transmit an RRC reconfiguration complete message to the second cell.

In the context of the embodiment illustrated in FIG. 21, the embodiment illustrated in FIG. 22, the embodiment illustrated in FIG. 23 and/or the embodiment illustrated in FIG. 24, the measurement report may comprise a beam measurement result.

In the context of the embodiment illustrated in FIG. 21, the embodiment illustrated in FIG. 22, the embodiment illustrated in FIG. 23 and/or the embodiment illustrated in FIG. 24, the measurement report may comprise information associated with the DL signal. Alternatively and/or additionally, the information may comprise an identifier associated with the DL signal and/or a quality (e.g., an RSRP) associated with the DL signal.

In the context of the embodiment illustrated in FIG. 21, the embodiment illustrated in FIG. 22, the embodiment illustrated in FIG. 23 and/or the embodiment illustrated in FIG. 24, the channel (and/or the first channel and/or the second channel) may be a PDCCH.

In the context of the embodiment illustrated in FIG. 21, the embodiment illustrated in FIG. 22, the embodiment illustrated in FIG. 23 and/or the embodiment illustrated in FIG. 24, the target beam may be associated with a highest quality of one or more qualities associated with one or more beams.

In the context of the embodiment illustrated in FIG. 21, the embodiment illustrated in FIG. 22, the embodiment illustrated in FIG. 23 and/or the embodiment illustrated in FIG. 24, the qualified beam may be associated with a quality that is greater than a threshold quality.

In the context of the embodiment illustrated in FIG. 21, the embodiment illustrated in FIG. 22, the embodiment illustrated in FIG. 23 and/or the embodiment illustrated in FIG. 24, the beam for monitoring the channel (and/or the first channel and/or the second channel) may be indicated using (and/or based upon) a TCI state.

In the context of the embodiment illustrated in FIG. 21, the embodiment illustrated in FIG. 22, the embodiment illustrated in FIG. 23 and/or the embodiment illustrated in FIG. 24, the DL signal may be (and/or may comprise) one or more DL signals. Alternatively and/or additionally, the DL signal may be (and/or may comprise) an SSB. Alternatively and/or additionally, the DL signal may be (and/or may comprise) a CSI-RS. Alternatively and/or additionally, the DL signal may refer to a beam.

In the context of the embodiment illustrated in FIG. 21, the embodiment illustrated in FIG. 22, the embodiment illustrated in FIG. 23 and/or the embodiment illustrated in FIG. 24, the signal may be an RRC reconfiguration message.

Alternatively and/or additionally, the signal may comprise mobility control information. Alternatively and/or additionally, the signal may comprise a UL grant for the second cell. Alternatively and/or additionally, the signal includes one or more beam identifiers, one or more DL signal identifiers, one or more SSB identifiers, one or more CSI-RS identifiers, a TCI state indication and/or a candidate list of beams.

In the context of the embodiment illustrated in FIG. 21, the embodiment illustrated in FIG. 22, the embodiment illustrated in FIG. 23 and/or the embodiment illustrated in FIG. 24, the UL grant may be a pre-allocated UL grant. Alternatively and/or additionally, the UL grant may be periodic (e.g., the UL grant may be a periodic UL grant).

In the context of the embodiment illustrated in FIG. 21, the embodiment illustrated in FIG. 22, the embodiment illustrated in FIG. 23 and/or the embodiment illustrated in FIG. 24, the UE may be performing an RACH-less handover procedure.

In the context of the embodiment illustrated in FIG. 21, the embodiment illustrated in FIG. 22, the embodiment illustrated in FIG. 23 and/or the embodiment illustrated in FIG. 24, the parameter may be RACH-less, RACH-skip and/or RACH-skipSCG.

In the context of the embodiment illustrated in FIG. 21, the embodiment illustrated in FIG. 22, the embodiment illustrated in FIG. 23 and/or the embodiment illustrated in FIG. 24, the first cell may be a PCell, an SpCell and/or an SCell.

In the context of the embodiment illustrated in FIG. 21, the embodiment illustrated in FIG. 22, the embodiment illustrated in FIG. 23 and/or the embodiment illustrated in FIG. 24, the second cell may be a PCell, an SpCell and/or an SCell.

In the context of the embodiment illustrated in FIG. 21, the embodiment illustrated in FIG. 22, the embodiment illustrated in FIG. 23 and/or the embodiment illustrated in FIG. 24, the first cell may be a source cell, a source eNB and/or a source gNB.

In the context of the embodiment illustrated in FIG. 21, the embodiment illustrated in FIG. 22, the embodiment illustrated in FIG. 23 and/or the embodiment illustrated in FIG. 24, the second cell may be a target cell, a target eNB and/or a target gNB.

A communication device may be provided, wherein the communication device may comprise a control circuit, a processor installed in the control circuit and/or a memory installed in the control circuit and coupled to the processor. The processor may be configured to execute a program code stored in the memory to perform method steps illustrated in FIG. 21, FIG. 22, FIG. 23 and/or FIG. 24. Furthermore, the processor may execute the program code to perform some and/or all of the above-described actions and steps and/or others described herein.

Figure 25:
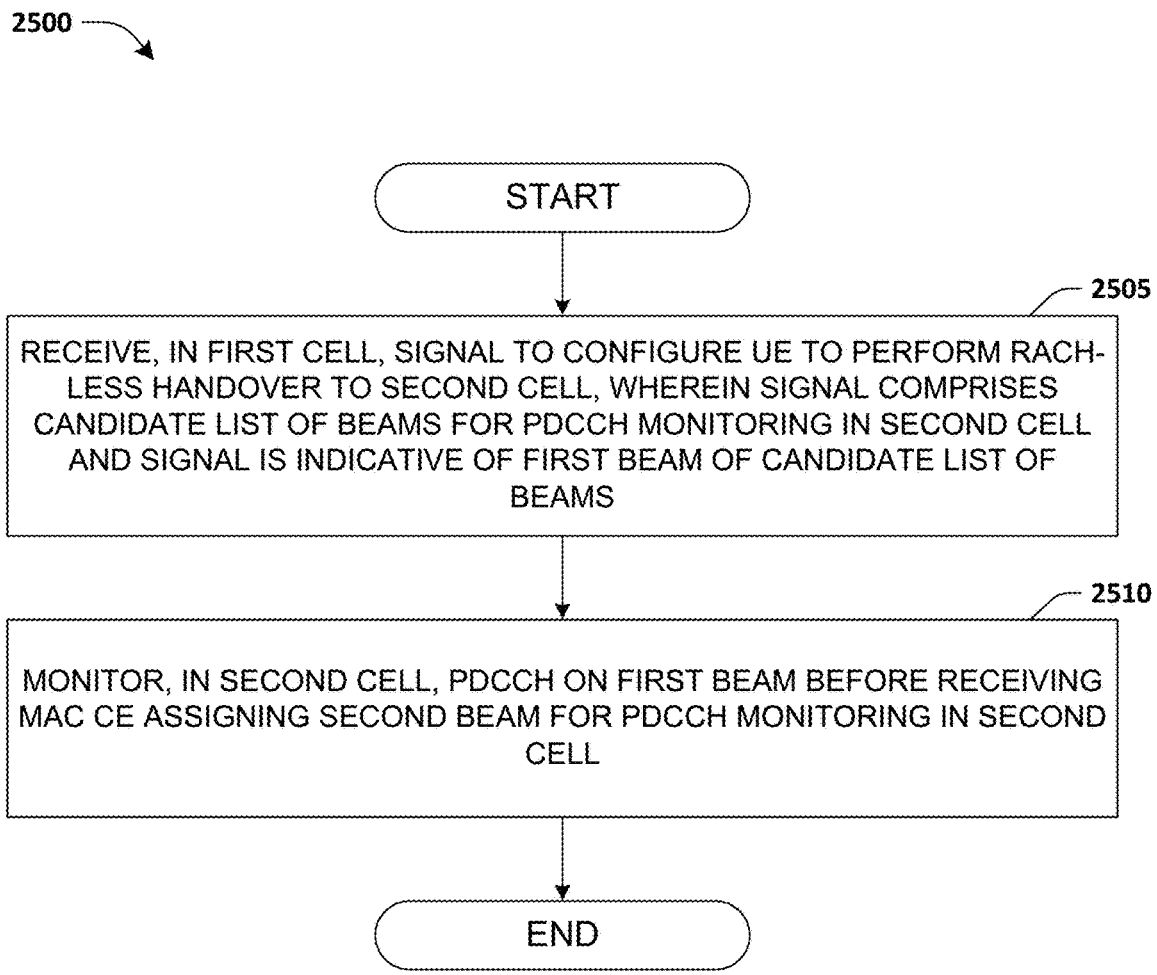
FIG. 25 is a flow chart according to one exemplary embodiment.

FIG. 25 is a flow chart 2500 according to one exemplary embodiment from the perspective of a UE. In step 2505, a signal to configure the UE to perform an RACH-less handover to a second cell may be received in a first cell, wherein the signal comprises a candidate list of beams for PDCCH monitoring in the second cell and/or the signal is indicative of a first beam of the candidate list of beams (to be used by the UE for PDCCH monitoring). In step 2510, a PDCCH in the second cell on the first beam may be monitored before receiving a MAC CE assigning a second beam for PDCCH monitoring in the second cell (e.g., the PDCCH in the second cell on the first beam may be monitored before receiving the MAC CE (comprising an instruction) to assign the second beam for PDCCH monitoring in the second cell).

Referring back to FIGS. 3 and 4, in one exemplary embodiment of a UE, the device 300 includes a program code 312 stored in the memory 310. The CPU 308 may execute program code 312 (i) to receive, in a first cell, a signal to configure the UE to perform an RACH-less handover to a second cell, wherein the signal comprises a candidate list of beams for PDCCH monitoring in the second cell and/or the signal is indicative of a first beam of the candidate list of beams (to be used by the UE for PDCCH monitoring), and (ii) to monitor, in the second cell, a PDCCH on the first beam before receiving a MAC CE assigning a second beam for PDCCH monitoring in the second beam. Furthermore, the CPU 308 can execute the program code 312 to perform some and/or all of the above-described actions and steps and/or others described herein.

In the context of the embodiment illustrated in FIG. 25 and discussed above, the signal may be (and/or may comprise) an RRC reconfiguration message. Alternatively and/or additionally, the signal may configure RACH-less, RACH-skip and/or RACH-skipSCG (e.g., the signal may be indicative of RACH-less, RACH-skip and/or RACH-skipSCG).

Alternatively and/or additionally, the candidate list of beams may be a TCI states PDCCH list (e.g., a list of TCI states).

Alternatively and/or additionally, the first beam and/or the second beam may be a TCI state (and/or may be associated with a TCI state). Alternatively and/or additionally, the first beam may be associated with a first TCI state and/or the second beam may be associated with a second TCI state. In some examples, the first TCI state may be different than the second TCI state. Alternatively and/or additionally, the first TCI state may be the same as the second TCI state.

Alternatively and/or additionally, the MAC CE may be an indication of a TCI state for UE specific PDCCH (e.g., the MAC CE may be indicative of the TCI state). Alternatively and/or additionally, the MAC CE may comprise information indicative of a serving cell identification (e.g., a serving cell ID), a BWP identification (e.g., a BWP ID), a CORESET identification (e.g., a CORESET ID) and/or a TCI state identification (e.g., a TCI State ID).

Figure 26:
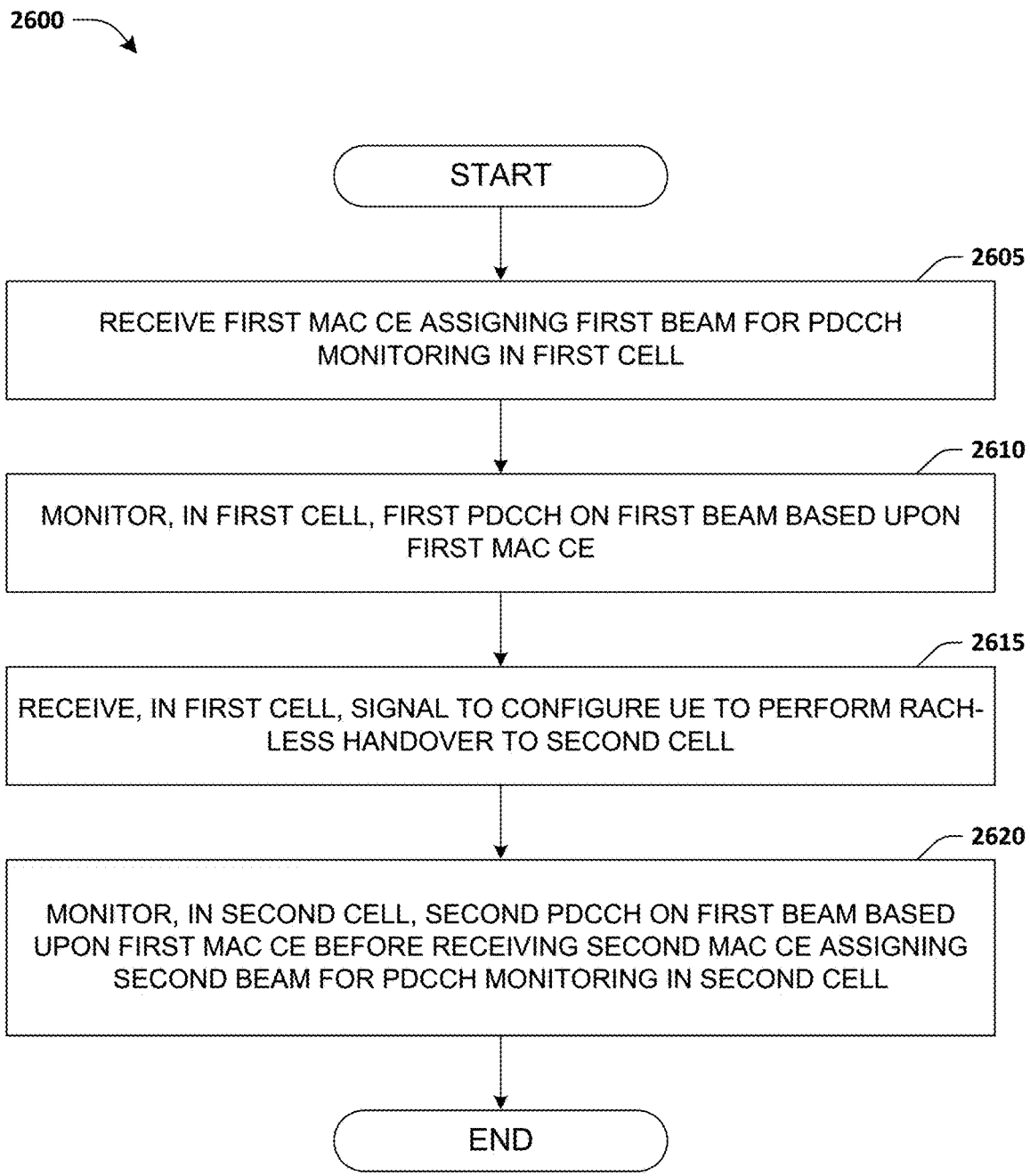
FIG. 26 is a flow chart according to one exemplary embodiment.

FIG. 26 is a flow chart 2600 according to one exemplary embodiment from the perspective of a UE. In step 2605, a first MAC CE assigning a first beam for PDCCH monitoring in a first cell may be received (e.g., the first MAC CE (comprising an instruction) to assign the first beam for PDCCH monitoring in the first cell may be received). In step 2610, a first PDCCH in the first cell on the first beam may be monitored based upon the first MAC CE. In step 2615, a signal to configure the UE to perform an RACH-less handover to a second cell may be received in the first cell. In step 2620, a second PDCCH in the second cell on the first beam may be monitored based upon the first MAC CE before receiving a second MAC CE assigning a second beam for PDCCH monitoring in the second cell (e.g., the second PDCCH in the second cell on the first beam may be monitored before receiving the second MAC CE (comprising an instruction) to assign the second beam for PDCCH monitoring in the second cell). In some examples, the first PDCCH may be different than the second PDCCH. Alternatively and/or additionally, the first PDCCH may be the same as the second PDCCH.

Referring back to FIGS. 3 and 4, in one exemplary embodiment of a UE, the device 300 includes a program code 312 stored in the memory 310. The CPU 308 may execute program code 312 (i) to receive a first MAC CE assigning a first beam for PDCCH monitoring in a first cell, (ii) to monitor, in the first cell, a first PDCCH on the first beam based upon the first MAC CE, (iii) to receive, in the first cell, a signal to configure the UE to perform an RACH-less handover to a second cell, and (iv) to monitor, in the second cell, a second PDCCH on the first beam based upon the first MAC CE before receiving a second MAC CE assigning a second beam for PDCCH monitoring in the second cell. Furthermore, the CPU 308 can execute the program code 312 to perform some and/or all of the above-described actions and steps and/or others described herein.

In the context of the embodiment illustrated in FIG. 26 and discussed above, the first MAC CE and/or the second MAC CE may be an indication of a TCI state for UE-specific PDCCH. Alternatively and/or additionally, the first MAC CE may be a first indication of a TCI state for UE-specific PDCCH and/or the second MAC CE may be a second indication of a TCI state for UE-specific PDCCH. In some examples, the first indication of a TCI state for UE-specific PDCCH may be different than the second indication of a TCI state for UE-specific PDCCH. Alternatively and/or additionally, the first indication of a TCI state for UE-specific PDCCH may be the same as the second indication of a TCI state for UE-specific PDCCH.

Alternatively and/or additionally, the first MAC CE may be received via the first cell, the second cell and/or a different cell. Alternatively and/or additionally, the second MAC CE may be received via the first cell, the second cell and/or a different cell.

Alternatively and/or additionally, the first MAC CE may comprise first information indicative of a serving cell identification (e.g., a serving cell ID), a BWP identification (e.g., a BWP ID), a CORESET identification (e.g., a CORESET ID) and/or a TCI state identification (e.g., a TCI State ID). Alternatively and/or additionally, the second MAC CE may comprise second information indicative of a serving cell identification (e.g., a serving cell ID), a BWP identification (e.g., a BWP ID), a CORESET identification (e.g., a CORESET ID) and/or a TCI state identification (e.g., a TCI State ID). In some examples, the first information may be different than the second information. Alternatively and/or additionally, the first information may be the same as the second information.

Alternatively and/or additionally, the signal may be an RRC reconfiguration message. Alternatively and/or additionally, the signal may configure RACH-less, RACH-skip and/or RACH-skipSCG (e.g., the signal may be indicative of RACH-less, RACH-skip and/or RACH-skipSCG).

Figure 27:
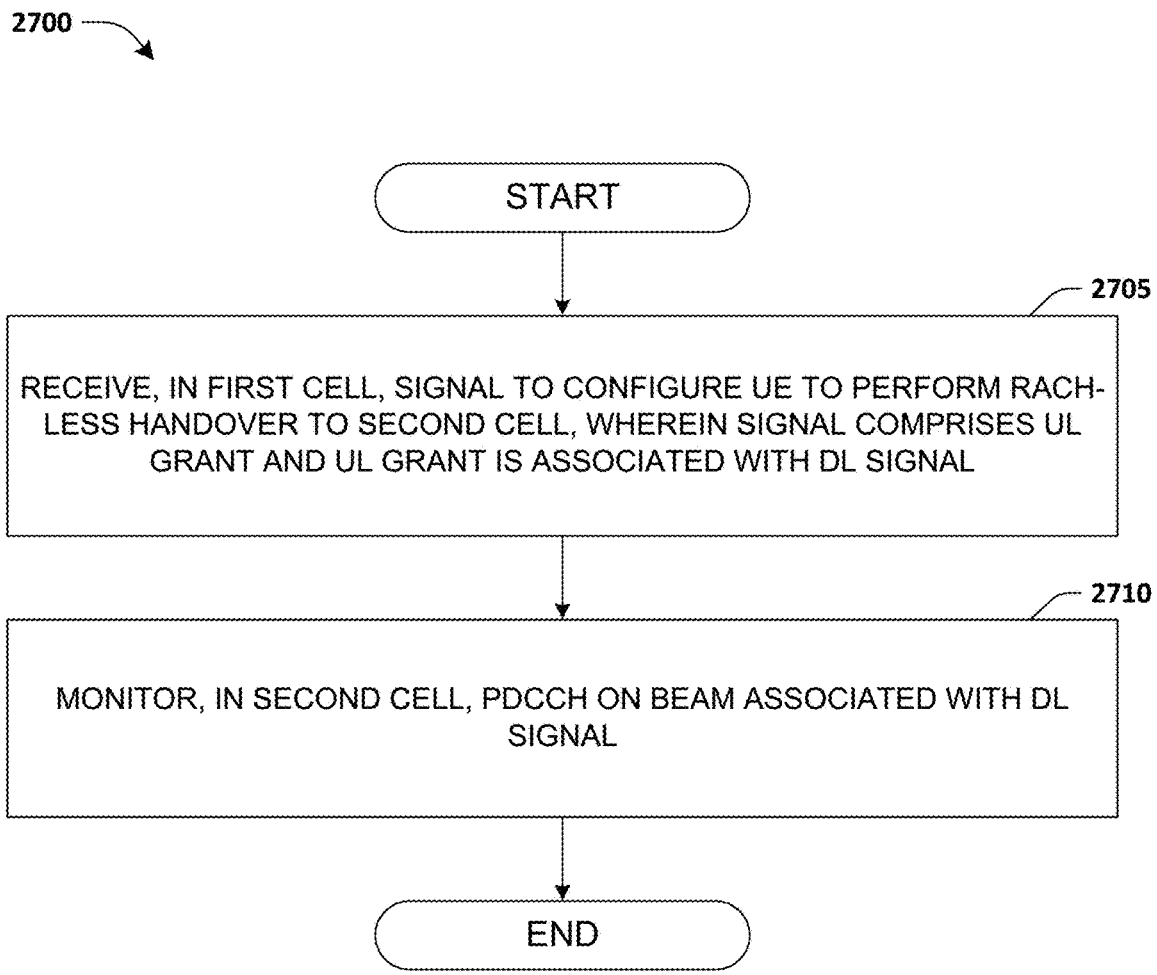
FIG. 27 is a flow chart according to one exemplary embodiment.

FIG. 27 is a flow chart 2700 according to one exemplary embodiment from the perspective of a UE. In step 2705, a signal to configure the UE to perform an RACH-less handover to a second cell may be received in a first cell, wherein the signal comprises a UL grant (to be used in the second cell) and/or the UL grant is associated with a DL signal. In step 2710, a PDCCH in the second cell on a beam associated with the DL signal may be monitored.

Referring back to FIGS. 3 and 4, in one exemplary embodiment of a UE, the device 300 includes a program code 312 stored in the memory 310. The CPU 308 may execute program code 312 (i) to receive, in a first cell, a signal to configure the UE to perform an RACH-less handover to a second cell, wherein the signal comprises a UL grant (to be used in the second cell) and/or the UL grant is associated with a DL signal, and (ii) to monitor, in the second cell, a PDCCH on a beam associated with the DL signal. Furthermore, the CPU 308 can execute the program code 312 to perform some and/or all of the above-described actions and steps and/or others described herein.

In the context of the embodiment illustrated in FIG. 27 and discussed above, the signal may be (and/or may comprise) an RRC reconfiguration message. Alternatively and/or additionally, the signal may configure RACH-less, RACH-skip and/or RACH-skipSCG (e.g., the signal may be indicative of RACH-less, RACH-skip and/or RACH-skipSCG).

Alternatively and/or additionally, the UL grant may be a periodic UL grant (and/or the UL grant may be periodic). Alternatively and/or additionally, the UL grant may be a pre-allocated UL grant. Alternatively and/or additionally, the UL grant may be used for the second cell.

Alternatively and/or additionally, the DL signal may be (and/or may comprise) an SSB. Alternatively and/or additionally, the DL signal may be (and/or may comprise) a CSI-RS.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), comprising:
receiving, in a first cell, a signal to configure the UE to perform a Random Access Channel-less (RACH-less) handover to a second cell, wherein:
the signal comprises a candidate list of beams for Physical Downlink Control Channel (PDCCH) monitoring in the second cell; and
the signal is indicative of a first beam of the candidate list of beams; and
monitoring, in the second cell, a PDCCH on the first beam indicated in the signal received in the first cell before receiving a Medium Access Control (MAC) Control Element (CE) assigning a second beam for PDCCH monitoring in the second cell.

2. The method of claim 1, wherein the signal is a Radio Resource Control (RRC) reconfiguration message.

3. The method of claim 1, wherein the signal configures at least one of RACH-less, RACH-skip or RACH-skipSCG.

4. The method of claim 1, wherein the candidate list of beams is a Transmission Configuration Indicator (TCI) states PDCCH list.

5. The method of claim 1, wherein at least one of the first beam or the second beam is a TCI state.

6. The method of claim 1, wherein the MAC CE is an indication of a TCI state for UE-specific PDCCH.

7. The method of claim 1, wherein the MAC CE comprises information of at least one of a serving cell identification, a bandwidth part (BWP) identification, a control resource set (CORESET) identification or a TCI state identification.

8. A method of a User Equipment (UE), comprising:
receiving a first Medium Access Control (MAC) Control Element (CE) assigning a first beam for Physical Downlink Control Channel (PDCCH) monitoring in a first cell;
monitoring, in the first cell, a first PDCCH on the first beam assigned for PDCCH monitoring in the first cell based upon the first MAC CE; and
monitoring, in a second cell, a second PDCCH on the first beam assigned for PDCCH monitoring in the first cell based upon the first MAC CE before receiving a second MAC CE assigning a second beam for PDCCH monitoring in the second cell.

9. The method of claim 8, wherein at least one of the first MAC CE or the second MAC CE is an indication of a TCI state for UE-specific PDCCH.

10. The method of claim 8, wherein the first MAC CE is received via at least one of the first cell, the second cell or a different cell.

11. The method of claim 8, wherein the second MAC CE is received via at least one of the first cell, the second cell or a different cell.

12. The method of claim 8, wherein at least one of the first MAC CE or the second MAC CE comprises information of at least one of a serving cell identification, a bandwidth part (BWP) identification, a control resource set (CORESET) identification or a TCI state identification.

13. The method of claim 8, further comprising:
receiving, in the first cell, a signal to configure the UE to perform a Random Access Channel-less (RACH-less) handover to the second cell, wherein the signal is a Radio Resource Control (RRC) reconfiguration message.

14. The method of claim 13, wherein the signal configures at least one of RACH-less, RACH-skip or RACH-skipSCG.

15. A method of a User Equipment (UE), comprising:
receiving, in a first cell, a signal to configure the UE to perform a Random Access Channel-less (RACH-less) handover to a second cell, wherein:
the signal comprises an uplink (UL) grant and an association between the UL grant and a downlink (DL) signal; and
monitoring, in the second cell, a PDCCH on a beam associated with the DL signal associated with the UL grant in the signal received in the first cell.

16. The method of claim 15, wherein the signal is a Radio Resource Control (RRC) reconfiguration message.

17. The method of claim 15, wherein the signal configures at least one of RACH-less, RACH-skip or RACH-skipSCG.

18. The method of claim 15, wherein the UL grant is at least one of a periodic UL grant or a pre-allocated UL grant.

19. The method of claim 15, wherein the UL grant is used in the second cell.

20. The method of claim 15, wherein the DL signal is at least one of a Synchronization Signal Block (SSB) or a Channel State Information based Reference Signal (CSI-RS).

* * * * *